US007016586B2

(12) United States Patent
Zoorob et al.

(10) Patent No.: US 7,016,586 B2
(45) Date of Patent: Mar. 21, 2006

(54) OPTICAL WAVEGUIDE STRUCTURE

(75) Inventors: Majd Zoorob, Hampshire (GB);
Martin Charlton, Hampshire (GB);
Greg Parker, Hampshire (GB)

(73) Assignee: Mesophotonics Limited, Southampton (GB)

( * ) Notice: Subject to any disclaimer, the term of this patent is extended or adjusted under 35 U.S.C. 154(b) by 35 days.

(21) Appl. No.: 10/465,559

(22) Filed: Jun. 20, 2003

(65) Prior Publication Data

US 2004/0264902 A1 Dec. 30, 2004

(51) Int. Cl.
*G02B 6/10* (2006.01)
(52) U.S. Cl. ............... 385/129; 385/131; 385/132; 385/27; 385/39; 385/28; 385/50
(58) Field of Classification Search ........... 385/129, 385/131, 132, 27, 24, 39, 28, 50, 15, 16
See application file for complete search history.

(56) References Cited

U.S. PATENT DOCUMENTS 6,512,866 B1 * 1/2003 Fan et al. ............... 385/27
6,643,439 B1 * 11/2003 Notomi et al. ............ 385/125

OTHER PUBLICATIONS

M. Koshiba, "Wavelength Division Multiplexing and Demultiplexing With Photonic Crystal Waveguide Couplers" *Journal of Lightwave Technology*, vol. 19, No. 12, Dec. 2001, pp. 1970-1975.
M. Koshiba et al, "Time-Domain Beam Propagation Method and Its Application to Photonic Crystal Circuits" *Journal of Lightwave Technology*, vol. 18, No. 1, Jan. 2000, pp. 102-110.
Y. Tsuji et al, "Finite Element Method Using Port Truncation by Perfectly Matched Layer Boundary Conditions for Optical Waveguide Discontinuity Problems" *Journal of Lightwave Technology*, vol. 20, No. 3, Mar. 2002, pp. 463-468.

* cited by examiner

Primary Examiner—Fayez G. Assaf
(74) Attorney, Agent, or Firm—Nixon & Vanderhye P.C.

(57) ABSTRACT

There is provided a planar waveguide structure (700) having a first core layer (708), a second core layer (704) and a cladding layer (706), wherein the cladding layer (706) is disposed between the first core layer (708) and the second core layer (704) to form an inter-core cladding layer (706). The inter-core cladding layer (706) comprises a first region (722) having a first refractive index and an array of sub-regions (724) formed therein having a second refractive index. The subregions (724) do not extend into either the first or the second core layer, and they give rise to a photonic band structure region, which is effective to perturb an evanescent field of an optical signal propagating through the core layers.

38 Claims, 34 Drawing Sheets

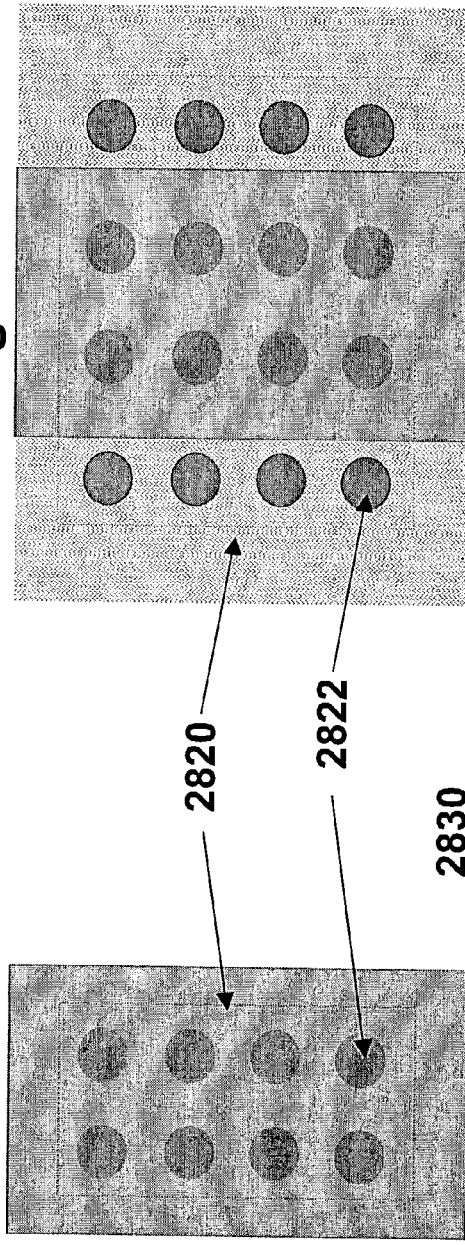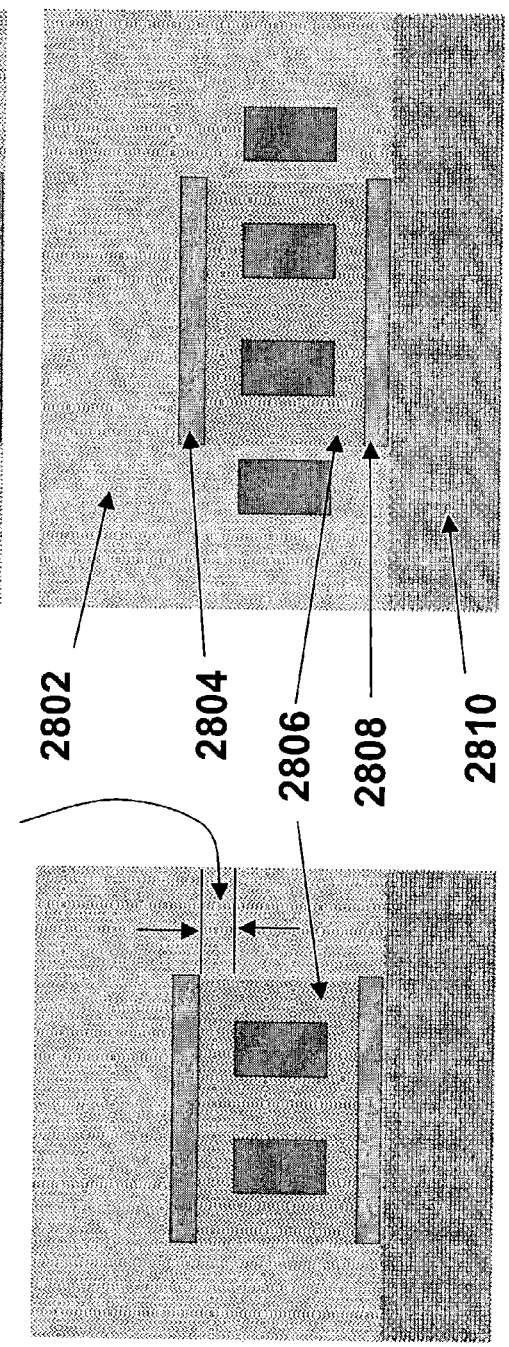

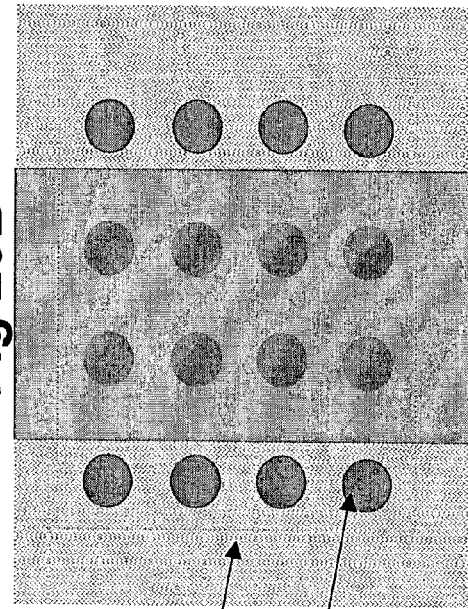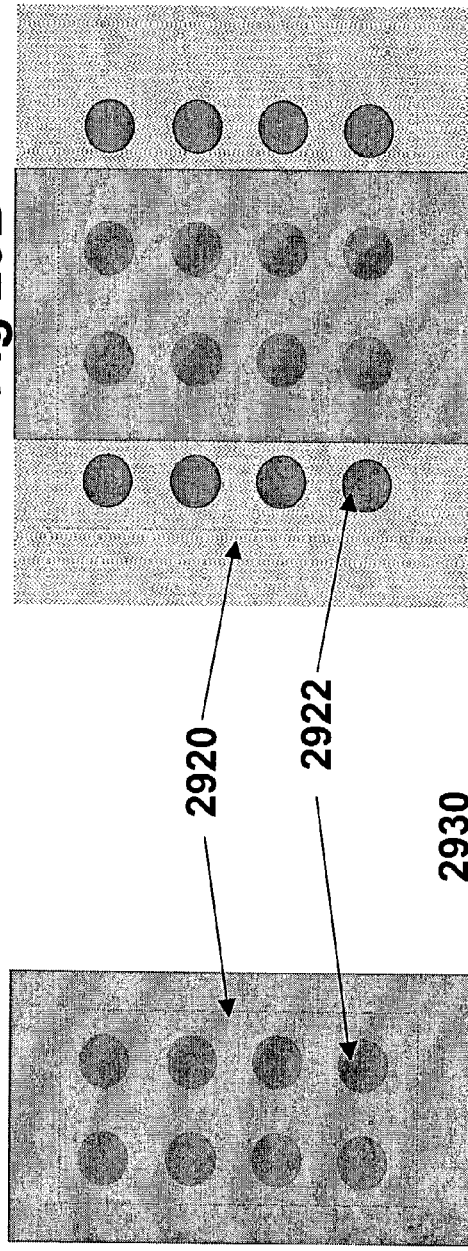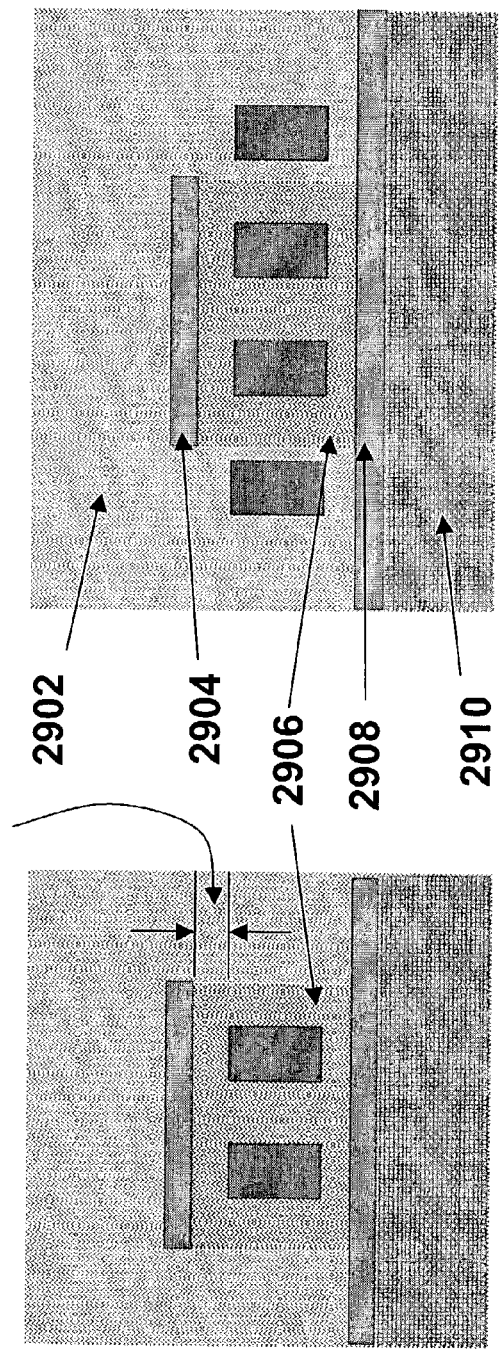

Fig 34A
3402
3404
3406
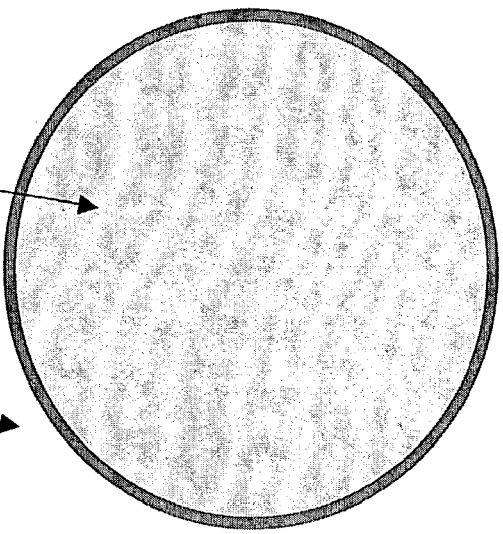
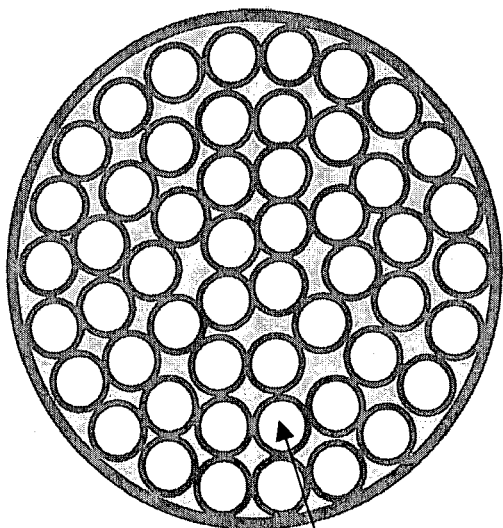
Fig 34B
3408
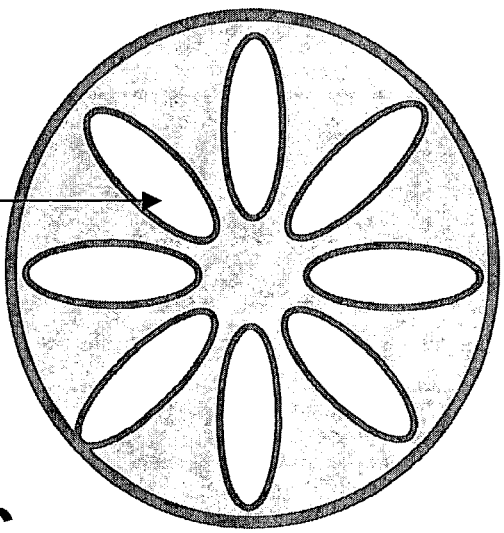
Fig 34C

OPTICAL WAVEGUIDE STRUCTURE

FIELD OF THE INVENTION

The present invention relates to the field of optical devices and in particular but not exclusively to waveguide structures in integrated optical circuits.

BACKGROUND TO THE INVENTION

It is increasingly recognised that integrated optical circuits have a number of advantages over electrical circuits. However, it has been difficult to produce integrated optical circuits that are comparably small, primarily due to the difficulty in producing waveguides that can include tight bends without large signal losses. It has also been difficult to produce integrated optical circuits including signal processing devices which can be easily coupled to current optical fibres, owing to a difference in the refractive index of the material used for optical fibres and those materials typically used for integrated optical devices, whilst still maintaining compact sizes.

Optical signals may be resonantly confined and manipulated using structures whose periodicity is of the same scale as an optical wavelength. Much recent interest has centred upon the field of photonic crystal (PC) structures.

Waveguiding photonic crystal structures are typically based on some perturbation in dielectric constant in the core of a planar waveguide structure. This has most commonly been performed by the spatially periodic etching of air rods through a cladding layer into the core layer of the waveguide. As light propagates through the core, it interacts with the dielectric constant modulation and, in some structures, certain electromagnetic fields are forbidden to propagate in the core, in a manner analogous to electrons in a semiconductor. The forbidden electromagnetic fields form a photonic bandgap. More detail on the nature of the band structure of photonic crystals of this sort can be found in WO 98/53351.

In co-pending patent application (PJF01501US—"Cladding PC"), it was shown that placing a PC in the cladding could provide improved performance for the PC, by reducing the out-of-plane losses and the ability of the PC to couple into near zero group velocity points. Here, the PC in the cladding does not extend into the core layer yet perturbs the evanescent field of an optical signal propagating through that layer.

SUMMARY OF INVENTION

In accordance with an aspect of the present invention there is provided, a planar waveguide structure having a first core layer, a second core layer and an inter-core cladding layer disposed between the first core layer and the second core layer, wherein the inter-core cladding layer comprises a first region having a first refractive index, $n_{inter}$, and an array of sub-regions formed therein having a second refractive index, $n_{sub}$, which do not extend into either the first or the second core layer, the array of sub-regions giving rise to a photonic band structure region, which is effective to perturb an evanescent field of an optical signal propagating through the core layers.

Forming cladding-only sub-regions in the inter-core cladding layer is particularly advantageous where the waveguide structure is to be implemented for multimoded optical signals. In waveguide structures having sub-regions through the core layer, the mode profile encountered can vary significantly depending upon which modes are present. Waveguides with sub-regions formed in inter-core cladding alone will encounter only the evanescent tail of each mode profile. The variability in shapes of evanescent tails is far less than the variation encountered in the field profile of the guided mode in the core. Waveguides in accordance with this aspect of the present invention have less variation in their effect upon different modes, thereby allowing application to signals propagating along multimode optical waveguides.

Planar waveguide structures in accordance with the present invention permit high power, multi-moded PC operation. Thinner buffer layers are needed.

The thin cores of the inventive waveguide structures are associated with small dispersion losses and long wavelengths. The PC in the inventive waveguide structures operate at even lower dispersion loss rates than (single-cored) cladding PC; the inventive structure being symmetric now and excluding the possibility of grating-like coupling.

In planar waveguide structures, the contrast between the effective mode index in the locality of the sub-regions and the first region of cladding material surrounding the sub-regions determines the photonic band structure of the cladding PC. Effective mode index is a weighted measure of the degree to which the field confines in different layers of the waveguide. In the absence of a photonic crystal in the core, it is irrelevant to discuss the contrast between the refractive indices of the core and the sub-regions. Instead the relative degrees of confinement are measured through the comparison of the mode seeing the waveguide and then seeing a waveguide with a sub-region in the cladding. The evanescent field being perturbed in the sub-regions, results in a change in the effective mode index in the neighbourhood of the sub-regions.

The present invention results in cladding PCs that have effective dielectric contrasts as pronounced as conventional PCs even though operation is cladding PC. The additional benefits of cladding PCs are described in detail in the co-pending application, PJF01501US.

Knowing the values of certain parameters (including refractive index and thickness), it is possible to model the vertical confinement of light in such multilayer planar waveguides. In particular, one can calculate the expected value of the effective mode index contrast for any permutation of the initial parameters. In a preferred method of calculating the effective mode index contrast, transfer-matrix theory and complex number theory are used to derive a dispersion relation for an arbitrary multilayer planar waveguide. The singularity points of the dispersion relation correspond to the propagation characteristics of guided modes, i.e. the relationship between frequency and wavenumber for guided, vertically confined, modes. With knowledge of the wavenumber and frequency, the effective refractive index and mode cross-section can be derived at any position along a planar waveguide. Normally, in a conventional straight-sided homogeneous waveguide, the mode cross-section and effective index do not vary along its length, however, in a PC cladding waveguide, mode cross-section and effective index vary from region to region. In both cases, the effective mode index can be substantially different from that of the waveguide core material. The effective mode index contrast of importance for the band structure calculation is the percentage difference between the mode seeing the waveguide away from sub-regions and the same mode seeing a waveguide in the presence of sub-regions in the cladding and/or buffer layers.

In this waveguide structure, there is preferably an effective mode index contrast acting upon the optical signal as the signal passes through the photonic band structure region that is greater than 0.1 percent.

The sub-regions may be arranged in one dimensional or two dimensional arrays. The minimum effective mode index contrast of 0.1% is surpassed even with air filled sub-regions and can be substantially increased by forming the sub-regions from a material with a high refractive index, for instance silicon. As these two examples, air and silicon, show, there are two regimes for which the refractive index of the sub-region material is different from the effective mode index of the waveguide. The sub-region may have a higher index than that of the effective mode index, as it does in the case of silicon. It is feasible that the sub-regions are composed of the same material as the core, for example silicon nitride, silicon oxynitride or tantalum pentoxide. Provided the effective index is significantly different from the refractive index of the core material the cladding PC will still function. By providing thin cores, a significant difference between the effective mode index of the core and the refractive index of the core material can be induced. The alternative regime covers the situation where the sub-regions have a lower refractive index than the effective mode index of the waveguide. Again a whole range of materials can be used provided that the refractive index for that material is lower than the effective index of the waveguide, for example air.

The first core layer may have a first thickness while the second core layer has a second thickness, the first thickness being different from the second thickness, such that afield profile of an optical signal propagating through the core layers is asymmetric with respect to the core layers.

Preferably, there is a clearance in the inter-core cladding layer between the array of sub-regions and at least one of the core layers, such that the material of the sub-regions is spaced apart from the core layer at a pre-determined distance.

The structure advantageously further comprises a first outer cladding layer, the first outer cladding layer comprising a first outer cladding region having a third refractive index $n_{outer\_1}$. The first outer cladding layer may in turn further comprise an array of first outer cladding sub-regions having a fourth refractive index $n_{out\_sub\_1}$, which do not extend into the core layer, the array of first outer cladding sub-regions giving rise to a first outer cladding photonic band structure region, which is effective to perturb further the evanescent field of the optical signal propagating through the core layers. The effective mode index contrast acting upon the optical signal as the signal passes through the first outer cladding photonic band structure region is preferably greater than 0.1 percent.

The first outer cladding layer may be a buffer layer disposed adjacent to the first core layer at an opposite side of the first core layer from the inter-core cladding layer or a capping layer disposed adjacent to the second core layer at an opposite side of the second core layer from the inter-core cladding layer.

It is preferred that, the structure having a first outer cladding layer might further incorporate a second outer cladding layer, the second outer cladding layer comprising a second outer cladding region having a fifth refractive index $n_{outer\_2}$. Advantageously, the second outer cladding layer further comprises an array of second outer cladding sub-regions having a sixth refractive index $n_{out\_sub\_2}$, which do not extend into the core layer, the array of second outer cladding sub-regions giving rise to a second outer cladding photonic band structure region, which is effective to perturb further the evanescent field of the optical signal propagating through the core layers. The effective mode index contrast acting upon the optical signal as the signal passes through the second outer cladding photonic band structure region is preferably greater than 0.1 percent.

A clearance may be provided in the first outer cladding layer between the array of first outer cladding sub-regions and at least one of the core layers, such that the material of the first outer cladding sub-regions is spaced apart from that core layer at a pre-determined distance.

A clearance may also be provided in the second outer cladding layer between the second outer cladding sub-regions and at least one of the core layers, such that the material of the second outer cladding sub-regions is spaced apart from the core layer at a pre-determined distance.

The first core layer and the second core layer are advantageously formed from a diffused material. Alternatively, the first core layer and the second core layer may be formed from a graded material.

At least one of the first core layer and the second core layer may be formed as a rib having a predetermined breadth. The or each ribbed core is then preferably tapered from a first predetermined breadth to a second predetermined breadth, the second predetermined breadth being less than the first predetermined breadth.

Both the first core layer and the second core layer may be formed as ribs.

In accordance with another aspect of the present invention, there is provided an annular waveguide structure having an annular core layer and an inner cladding layer, wherein the inner cladding layer is substantially surrounded by the annular core layer and wherein the inner cladding layer comprises a first region having a first refractive index, $n_{inner}$, and a one-dimensional array of sub-regions formed therein having a second refractive index, $n_{sub}$, which do not extend into the annular core layer, the array of sub-regions giving rise to a photonic band structure region, which is effective to perturb an evanescent field of an optical signal propagating through the core layer.

The annular waveguide structure may further include an outer capping layer that substantially surrounds the annular core layer.

The inner cladding layer advantageously includes a number of longitudinal cavities. By selecting the sizes of cavities, the average first refractive index, $n_{inner}$, can be tuned to a predetermined value. Preferably, the average first refractive index, $n_{inner}$, is tuned to be substantially 1.

In accordance with yet another aspect of the present invention, there is provided a method of manufacturing double core planar waveguide structures; comprising the steps of: depositing a buffer layer; depositing a first core layer over said buffer layer; depositing an inter-core cladding layer; defining a sub-region pattern; etching inter-core sub-regions at least partially through the inter-core cladding layer in accordance with the sub-region pattern; depositing a second core layer over the inter-core cladding layer; and depositing a capping layer over the second core layer.

The method may further comprise the step of: filling the inter-core sub-regions with a third material after etching and before depositing the second core layer. In which case, it is advantageous to remove any excess third material after filling the inter-core sub-regions.

The method preferably includes the step of: depositing a thin layer of the inter-core cladding material after filling the inter-core sub-regions and before depositing the second core layer. The thin layer of the inter-core cladding material thereby forms a clearance in the inter-core cladding.

The method may further comprise the step of: defining a rib pattern; and etching a rib structure through the second core layer. The etching can be made deeper such that the method also includes etching the rib structure through the inter-core cladding layer and the first core layer.

The rib pattern is preferably tapered.

In accordance with a further aspect of the present invention, there is provided a method of manufacturing annular waveguide structures comprising: forming an annular core layer; forming an inner cladding layer, wherein the inner cladding layer is substantially surrounded by the annular core layer and wherein the inner cladding layer comprises a first region having a first refractive index, $n_{inner}$; and, in the inner cladding layer, forming a one-dimensional array of sub-regions having a second refractive index, $n_{sub}$, which do not extend into the annular core layer, the array of sub-regions giving rise to a photonic band structure region, which is effective to perturb an evanescent field of an optical signal propagating through the core layer:

The annular core layer is preferably formed by coating an outer surface of a tube of inner cladding material with a core layer material. The formation of the inner cladding layer may then include: inserting either a solid rod or a number of glass tubes of inner cladding material inside the coated tube; heating the tube and the coated rod until the tube and rod fuse; and then pulling the fused structure longitudinally.

In accordance with a yet another aspect of the present invention, there is provided a method of guiding an optical signal comprising the step of passing an optical signal through a waveguiding region of a planar optical waveguide structure comprising a first core layer, a second core layer and an inter-core cladding layer; wherein the inter-core cladding layer comprises a first region having a first refractive index $n_{inter}$, and an array of sub-regions having a second refractive index $n_{sub}$, the sub-regions not extending into the core layers, and wherein the array of sub-regions gives rise to a photonic band structure region, which is effective to perturb an evanescent field of the optical signal propagating through the core layers.

BRIEF DESCRIPTION OF THE DRAWINGS

Examples of the present invention will now be described in detail with reference to the accompanying drawings, in which:

FIG. 28 shows two alternative arrangements of a double core waveguide structure with an inter-core cladding PC in accordance with a further aspect of the present invention, wherein both waveguide cores are defined as ribs;

FIG. 29 shows two alternative arrangements of a double core waveguide structure with an inter-core cladding PC in accordance with a further aspect of the present invention, wherein the upper waveguide core is defined as a rib;

FIG. 34 shows cross-sections through examples of thin hollow core optical fibre waveguides in accordance with the present invention; and, FIG. 35 shows a flow diagram of the manufacture of double core waveguide structures in accordance with the present invention.

DETAILED DESCRIPTION

Unless otherwise stated, field profile diagrams throughout are shown for an operating wavelength of 1.55 μm. For simplicity, it is also assumed that the top cladding layer is of effectively infinite thickness.

Embodiments of the present invention may be deployed as photonic elements in many different applications. Photonic elements, including those of the present invention, may be implemented in telecommunications systems, in biosensor devices, and in optical storage media.

Figure 1:
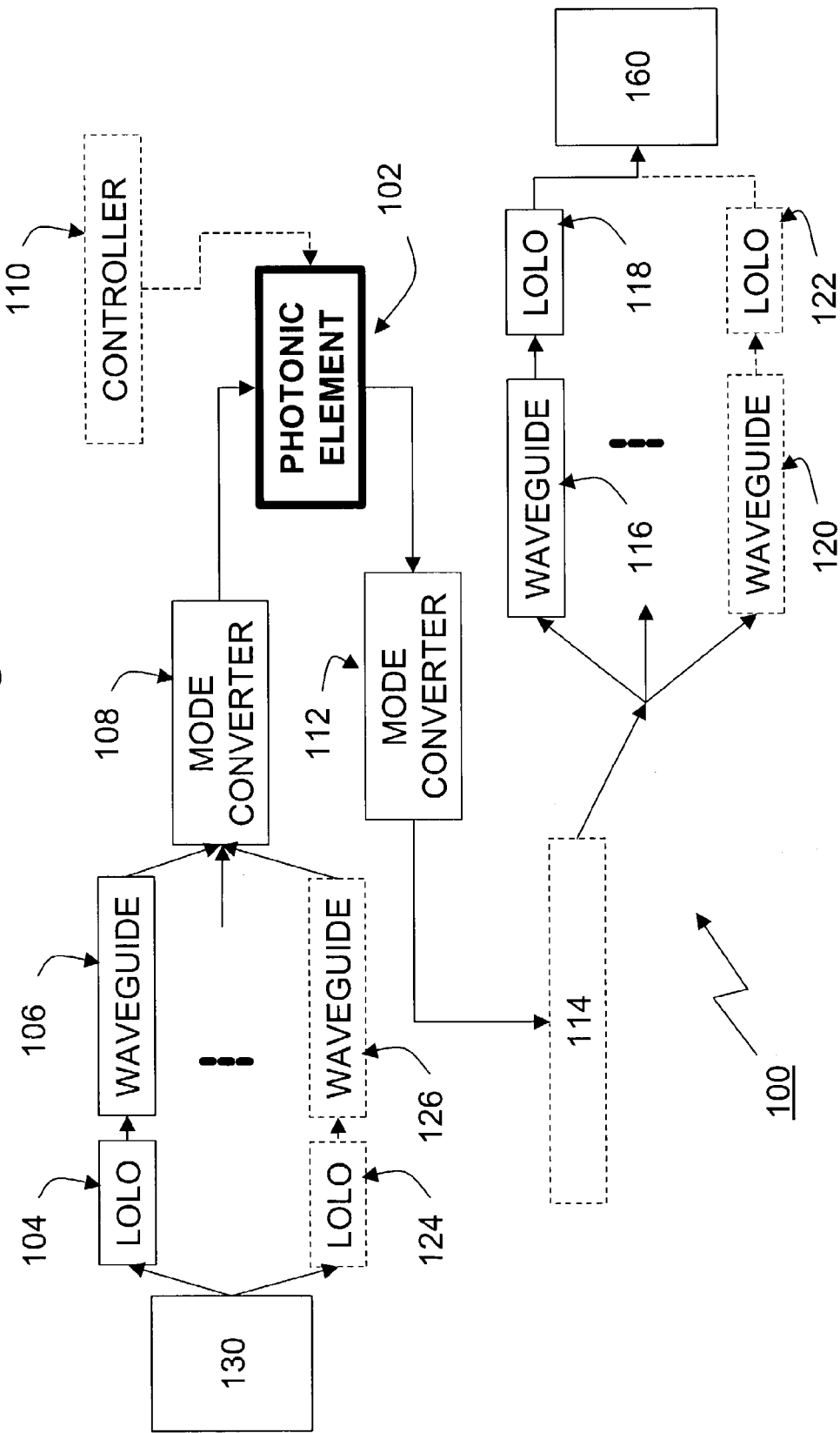
FIG. 1 illustrates a telecommunications system suitable for incorporating a waveguiding structure in accordance with the present invention.

FIG. 1 illustrates the general arrangement of a photonic device 100 incorporating a photonic element 102. The illustrated photonic device 100 is suitable for use in a telecommunications system. A light signal typically propagates along a waveguiding structure 150, such as an optical fibre. The photonic device 100 includes: at least one Light On Light Off (LOLO) device 104, 124; at least one waveguide element 106, 126; a mode converter 108; the photonic element 102; a further mode converter 112; at least one further waveguide element 116,120; and at least one further LOLO device 118,122.

The LOLO device 104 couples the waveguiding structure 150 to other components of the photonic device 100, in the process converting the mode of the telecommunications waveguiding structure 150 (which is typically large, approximately 8 μm in diameter) into a much smaller (approx. 1 to 2 μm in diameter) planar waveguide mode that can propagate along the photonic device 102 with minimal loss. In many cases, several channels need simultaneous processing and multiple fibre inputs are provided.

Following the coupling of light from the external waveguiding structure 150 to the photonic device 102, horizontal confinement of the mode is commonly provided by at least one waveguide element 106. Waveguide elements 106 such as rib or ridge waveguides are often implemented in high refractive index contrast planar material systems. Other waveguide elements 106 include waveguide splitters and bends. By means of these waveguide elements 106 (PC defect state waveguides, ribs, ridges, splitters and/or bends), light from the LOLO device 104 is transported from one region of the device to another.

The mode converter 108 is required to provide efficient coupling of light from the waveguide into the photonic element 102. Examples of wave converters include tapers, multi-mode interference slab couplers, and star couplers. Efficient coupling requires attention to appropriate propagation modes and angles in the photonic element 102, in order to couple into the correct dispersion point on the PC band structure and also to minimise reflections and loss from the interface of the element 102. Following the conversion of the mode, the light is processed by, and propagates through, the photonic element 102.

The operation of photonic element 102 may be altered in a number of ways, including the application of an optical and/or an electrical control signal. The means for altering the operation of the photonic element 102 is represented in the Figure as an (optional) controller element 110. Examples of suitable controller elements 110 include optical control signal sources, electrical control signal sources, optical pumps, acoustic wave (SAW) structures, magnetic field sources, vibration sources (piezoelectric) or temperature control devices, depending on the functionality of the photonic element.

The mode is converted back again into a mode for propagation along the waveguide by the further mode converter 112. Optionally, additional photonic elements 114 can be inserted to provide extra functionality and to increase the integration capabilities of the photonic device. The additional photonic elements 114, when provided, may be associated with a corresponding variety of connecting optical components, including further waveguide devices and/or splitters. As the reader will appreciate, the connecting optical components may themselves be formed as integrated photonic elements as well as conventional waveguides joining the photonic elements. The optional, additional photonic element feature in the Figure represents the presence of at least one photonic element and the concomitant connecting optical components in order to provide a highly integrated optical device.

Finally, at least one further waveguide element 116 (ribs, ridges, splitters and/or bends) is used to guide the light along to the further LOLO device 118. In this arrangement, the light is coupled back out into an output waveguiding structure 160, an optical fibre, say. Multiple waveguide elements 116,120 and LOLO devices 118,122 can be used for applications such as demultiplexers.

It is further noted that the further waveguide elements 116,120 and further LOLO devices 118,122 may be one and the same as the LOLO devices 104,124 and waveguide elements 106,126.

Figure 2:
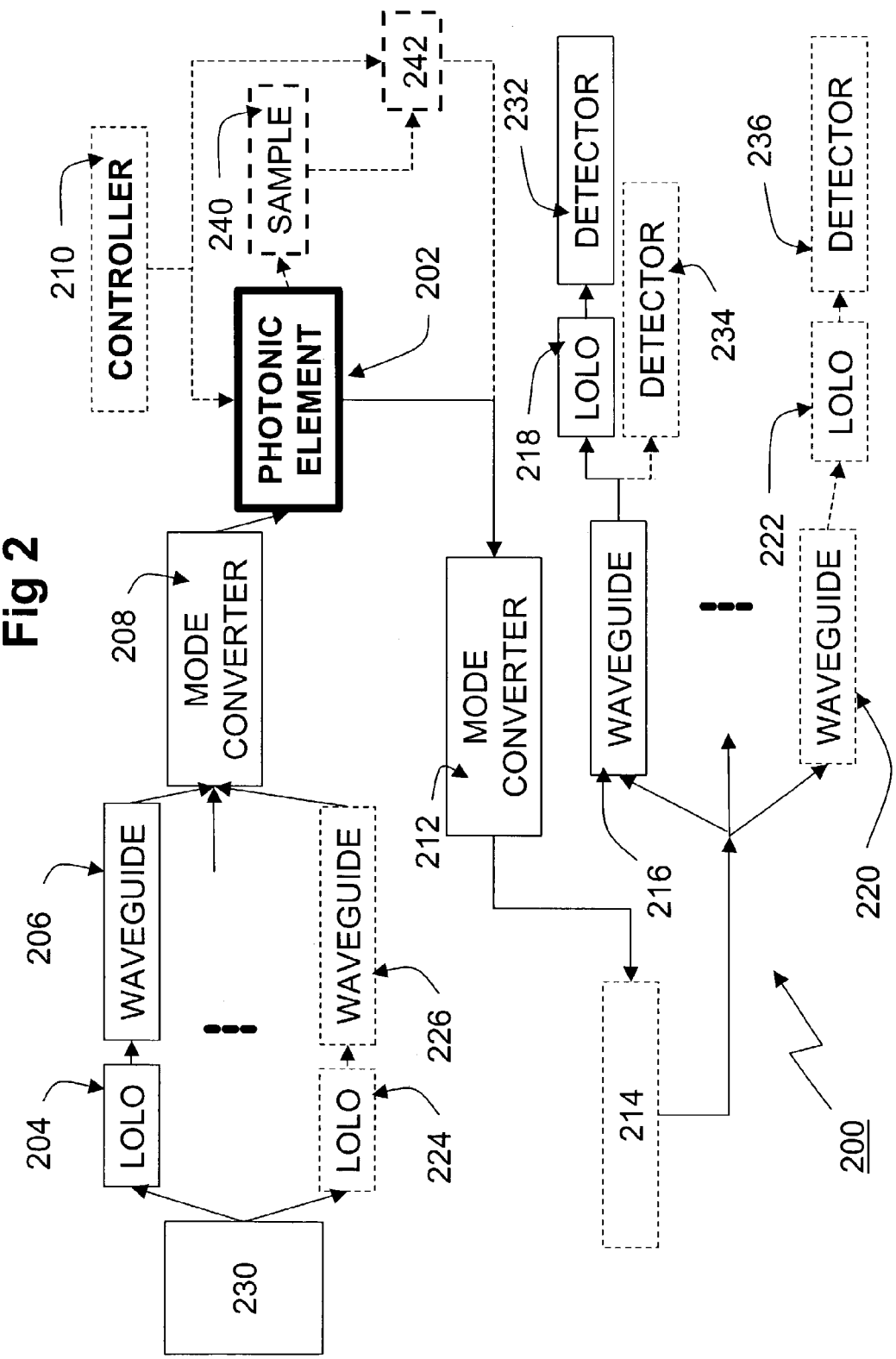
FIG. 2 illustrates a biosensor system suitable for incorporating a waveguiding structure in accordance with the present invention.

FIG. 2 illustrates the general arrangement of another photonic device 200 incorporating a photonic element 202. The illustrated photonic device 200 is suitable for use in a biosensor arrangement.

The photonic device 200 includes: at least one Light On Light Off (LOLO) device 204, 224; at least one waveguide element 206, 226; a mode converter 208; the photonic element 202; a further mode converter 212; at least one further waveguide element 216,220; and at least one detector 236,234,232.

Light from a light source 230, for example a laser or a light emitting device (LED), is launched into the or each waveguide element 206 via a corresponding LOLO device 204. The launching of light could simply be end-facet coupling of the light into the waveguide 206. Again, the waveguide element 206, may include bends, splitters, ribs and/or ridge structured waveguides. The or each waveguide element 206 is used to guide incoming light into different regions of the photonic device 200 where illumination of different samples is performed.

The mode converter 208 is required to provide efficient coupling of light from the waveguide into the photonic element 202.

Preferably, the or each photonic element 202 is itself provided with sample recesses for receiving at least one sample (the sample may also be placed on the surface) and illumination is performed inside the photonic element 202. Alternatively, the photonic element 202 is arranged to launch the light into at least one external biological sample 240. In some examples of biosensor arrangements, the sample is assayed not as a result of direct illumination but rather through the observed interaction of the evanescent field of light propagating in the photonic element 202.

Illumination of biological and/or biochemical samples can result in characteristic luminescence properties, for example fluorescence or phosphorescence. In the preferred arrangement, light emitted from the or each sample is then collected at another portion of the photonic element 202: whereas, in the external sample arrangement, light emitted from the or each sample is collected at another photonic element 242.

The operation of photonic element 202, and where present the other photonic element 242, may be altered in a number of ways, including the application of an optical and/or an electrical control signal. The means for altering the operation of the photonic element 202,242 is represented in the Figure as an (optional) controller element 210. Examples of suitable controller elements 210 include optical, electrical, magnetic, vibrational or acoustic control signal sources, and optical pumps. Chemical controller elements can also be used: where the core can be composed of a pH sensitive gel, this can be induced to swell up, effectively changing the lattice pitch of the PC, or to change in refractive index, if the pH of the surrounding cladding is changed.

Following the collection of the light, the mode is converted into a mode for propagation along the waveguide by the further mode converter 212. Filtering and possible wavelength separation can then be performed using additional integrated photonic elements 214.

The processed light signal is then routed around at least one further waveguide element 216 (ribs, ridges, splitters and/or bends) is used to guide the light along to at least one integrated detector 234. Processed light may alternatively be routed externally, a further LOLO device 218,222 providing the interface with an external detector 232,236. Many applications require the use of multiple detectors, such as CCD arrays, in order to span a range of different wavelengths, for example Raman Spectroscopy, or in order to distinguish between different samples.

Figure 3:
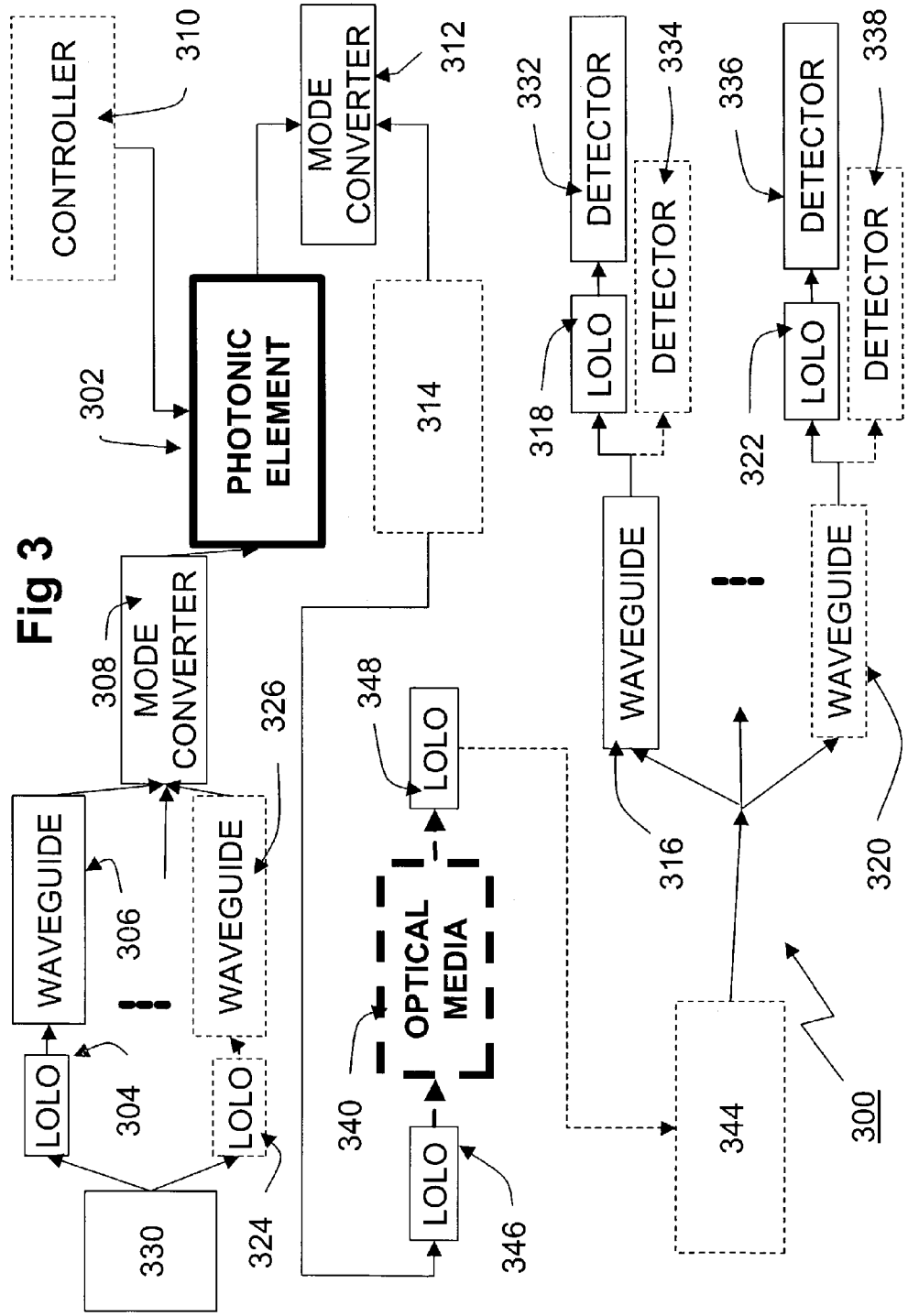
FIG. 3 illustrates an optical pick-up system suitable for incorporating a waveguiding structure in accordance with the present invention.

FIG. 3 also illustrates the general arrangement of a photonic device 300 incorporating a photonic element 302. The illustrated photonic device 300 is suitable for use in an optical pick-up unit, such as an optical disc reading head.

The photonic device 300 includes: at least one Light On Light Off (LOLO) device 304, 324; at least one waveguide element 306, 326; a mode converter 308; the photonic element 302; a further mode converter 312; at least one further waveguide element 316,320; and at least one integrated detector 334,338.

Light from a light source 330, for instance a modulated laser or LED source, is launched into the photonic device 300 by the LOLO element 304. Although not illustrated, light can also be coupled into the photonic device 300 from an external waveguiding structure, such as an optical fibre.

Light from the LOLO element 304 is coupled into the waveguide element 306. The waveguide element 306, may include bends, splitters, ribs and/or ridge structured waveguides. The or each waveguide element 306 is used to guide incoming light into different regions of the photonic device 300.

A mode converter 308 is required to provide efficient coupling of light from the waveguide element 306 into the photonic element 302. The photonic element 302 processes the light, for example it may serve to: filter; compensate for dispersion; focus, align or modulate the incoming light; or be the laser source for an optical processing unit, OPU (where the incoming light is used to pump this source).

The operation of photonic element 302, and where present the other photonic elements 314,344, may be altered in a number of ways, including the application of an optical and/or an electrical control signal. The means for altering the operation of the photonic element 302,314,344 is represented in the Figure as an (optional) controller element 310. Examples of suitable controller elements 310 include optical, electrical, magnetic, acoustic, vibrational and temperature control signal sources, as well as optical pumps.

The processed light output by the photonic element 302 is converted into a mode for propagation along the waveguide by the further mode converter 312. Filtering and possible wavelength separation can then be performed using additional integrated photonic elements 314.

The light is propagated into a LOLO element 346 where the light is focussed onto an optical storage medium 340 or interacts therewith by means of the evanescent field. The light is collected back again using another LOLO element 348 where it is processed again with at least one further integrated photonic element 344. The further integrated photonic element 344 includes photonic "building block" elements, for example dispersion compensators, focussing elements, filters and amplifiers.

The processed light from further integrated photonic element 344 is then coupled to at least one waveguide component 316 (ribs, ridges, splitters and/or bends) and thereby projected onto a detector 332,334,336,338 which can either be in the plane of the waveguide or external to the waveguide (hence requiring a LOLO element 318,322).

Figure 4:
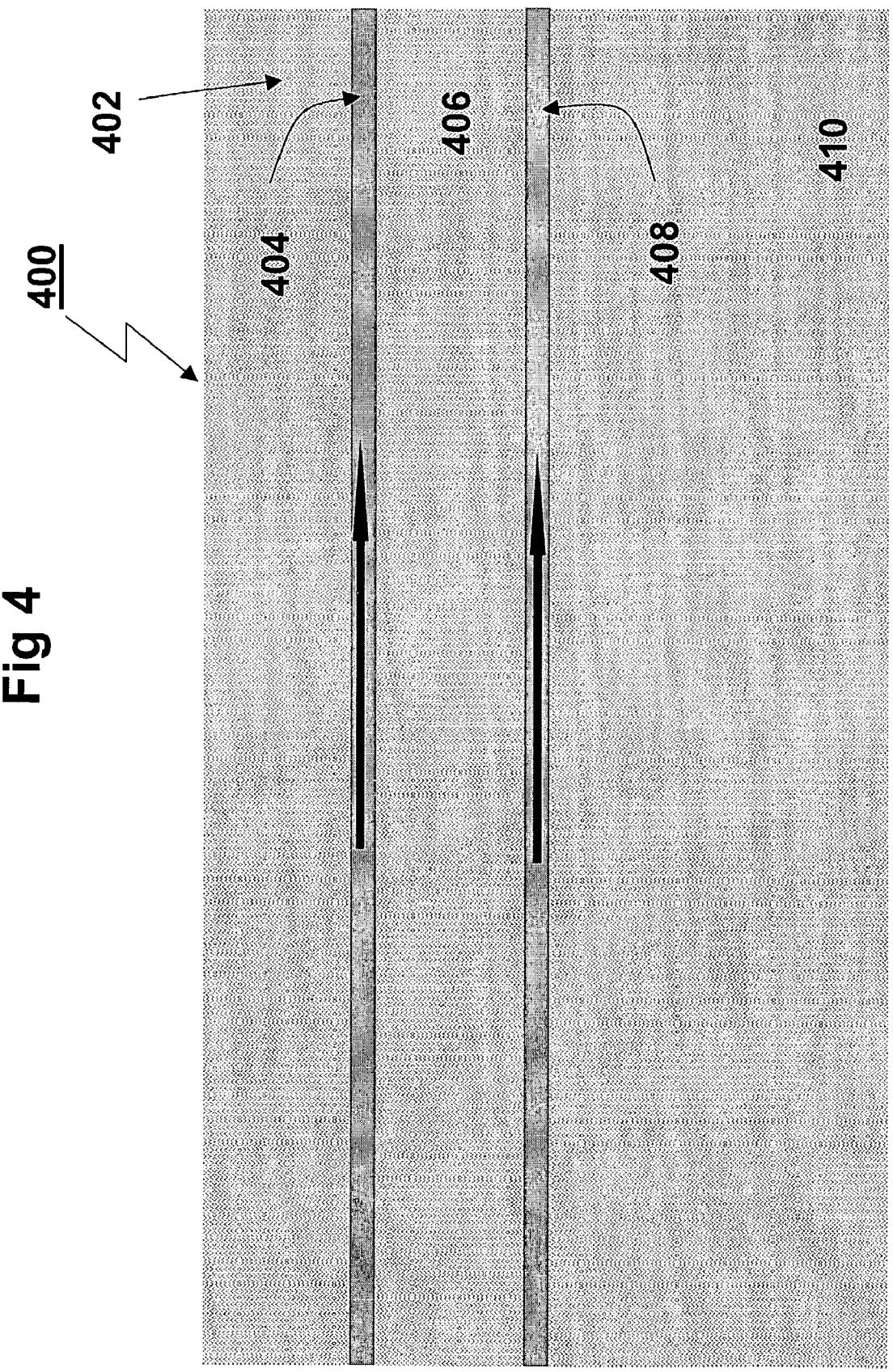
FIG. 4 illustrates a waveguide structure having two cores with an intervening cladding layer.

FIG. 4 illustrates a waveguide structure having two thin cores and an intervening cladding layer. Such a waveguide structure could be used in directional couplers and would benefit from by having lower dispersion (while still having thin waveguides), high power (while maintaining identical modes for all high order modes), and simplified coupling to large fibre modes.

Figure 5:
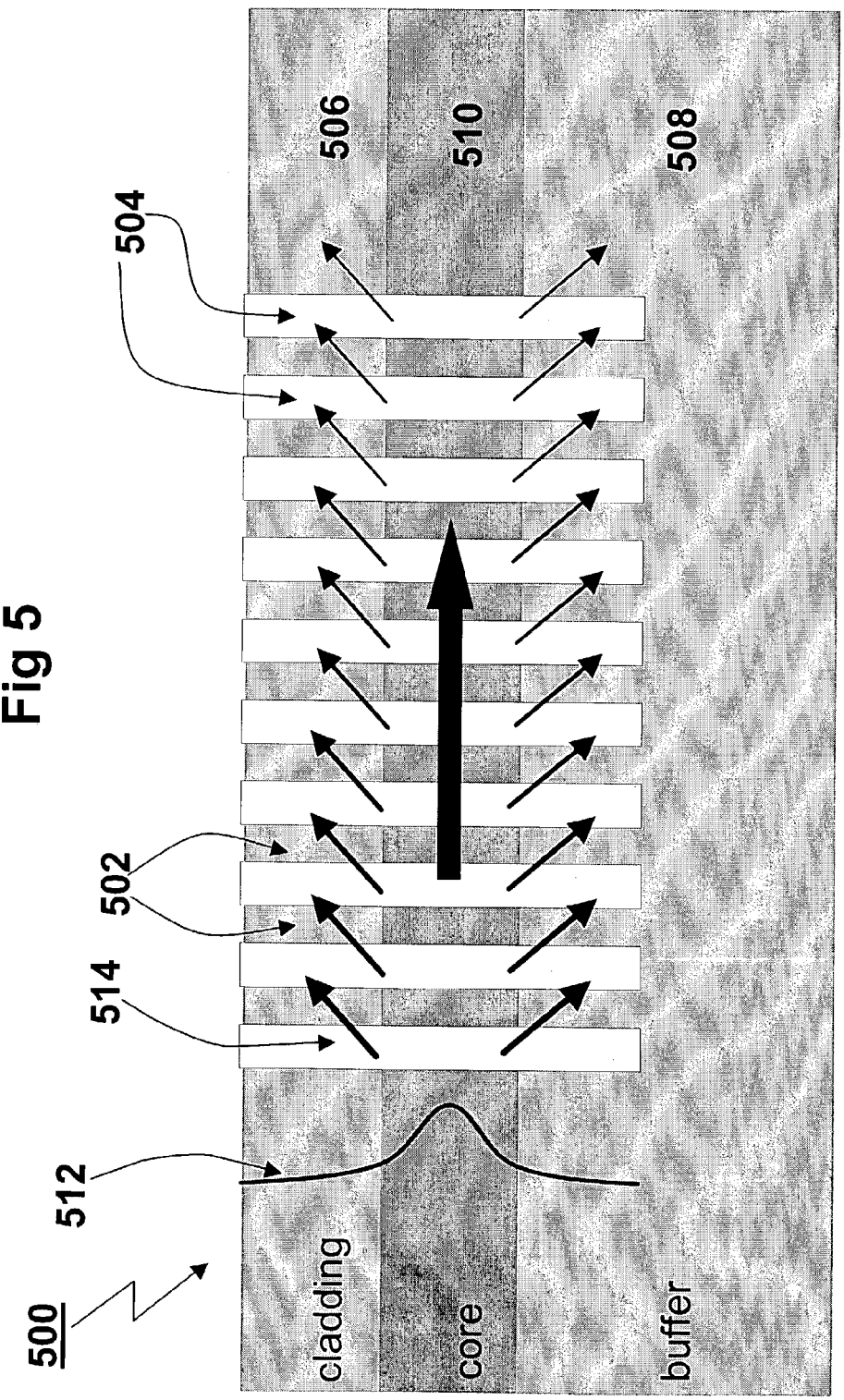
FIG. 5 shows a prior art PC waveguide structure having slots through a single core layer.

FIG. 5 shows a cross-sectional view of a conventional PC embedded in a waveguiding structure. A conventional PC waveguide structure 500 comprises: a core layer 510, through which the majority of incident light passes; a cladding layer 506, above the core layer; and a buffer layer 508, below the core layer. Sub-regions 504 extend through the cladding layer 506, the core layer 510 and partly into the buffer layer 508 beneath. The sub-regions are typically filled with air.

The curve 512 represents the field profile. The thick arrow proceeding from left to right represents the propagation of light along the core. The loss factor involved in the propagation of the light along the structure (caused by out-ofplane losses incurred at the air-dielectric interfaces) is represented by the strength of the arrows 514 directed out of the core. The mode confinement in the PC region is greatly reduced and hence the out-of-plane loss is increased.

The loss of mode confinement is due to the divergence of light at the interface between air and dielectrics. Although most of the light coupled back into the core away from the air filled sub-regions, a significant proportion does not.

It is also noted since the structure is not symmetric and since the light is not well confined in the vertical direction, light prefers to leak into the buffer layer because of the higher index (compared to air), where the lower evanescent field tail is drained into the buffer.

As disclosed in copending patent application (Attorney Docket No. PJF01501US), the applicant has discovered that substantially complete confinement of the mode in the core can be assured while still maintaining the ability to interact with the field within the photonic band structure region. Rather than perturb the majority of the field (which is confined in the core), it has been found that it is possible to interact with the evanescent field in the cladding layer (or for that matter in the buffer layer) without substantially affecting mode confinement. This interaction can be achieved by forming a waveguide arrangement with a PC in the cladding layer alone and not penetrating the core itself.

Figure 6:
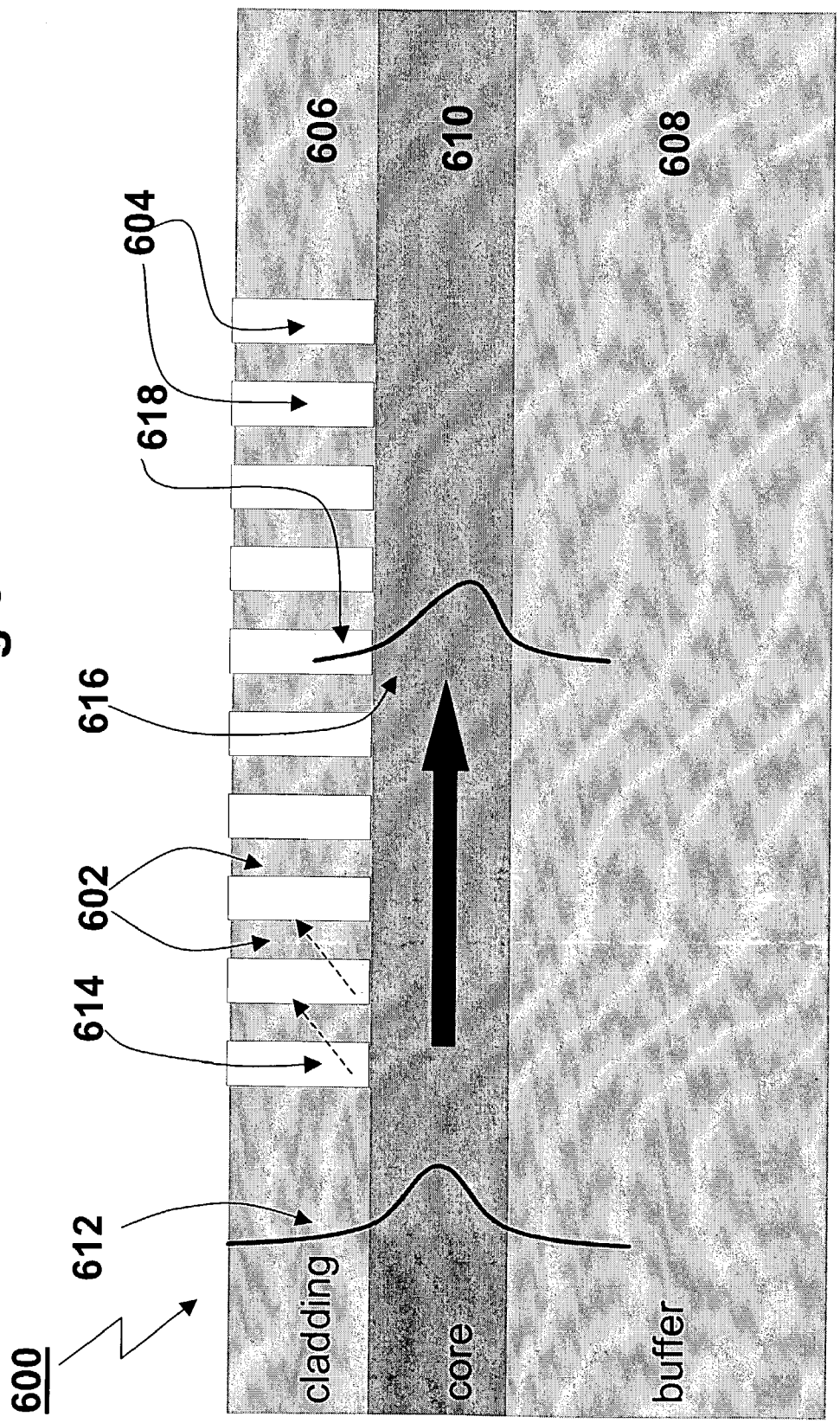
FIG. 6 shows a prior art cladding PC waveguide structure having slots through a cladding layer and a buffer layer but not through the single core layer.

FIG. 6 shows a prior art cladding PC waveguide structure 600 having slots through a cladding layer and a buffer layer but not through the single core layer. Here, the waveguide structure 600 comprises a core layer 610, a cladding layer 606 and a buffer layer 608. Sub-regions 604 are formed in the cladding layer 606 but not in the core layer 610. The field profile 612,616 varies according to whether a core/cladding 602 or a core/sub-region 604 interface in the vertical direction is experienced. In the vicinity of a core/sub-region interface 604, the evanescent field tail 618 extends out a shorter distance into the sub-region medium due to the different field confinement regimes between the waveguide alone and the waveguide with the sub-region medium. Hence the presence of a core/sub-region interface 604 pushes the field further down into the core while still maintaining strong confinement.

Again the loss factor involved in the propagation of the light along the structure is represented by the strength of arrows 614 directed out of the core. The cladding PC waveguide structure is seen to reduce the loss factor significantly.

Furthermore, evanescent fields always propagate perpendicular to the core/cladding interface, which provides 2D in-plane behaviour. In this cladding PC arrangement, a 2D perturbation of the evanescent field could provide behaviour much closer to theoretical predictions giving rise to very long group time delays at the photonic band edges or high dispersion points, of the order of a few milliseconds.

Conventional PC behaviour is greatly affected by the mode angle in the core of the waveguide. The mode angle distorts the PC behaviour and the 3D dispersion behaviour of the PC in the core greatly reduces the extreme changes in the group velocity typically associated with the band edges.

In a two-dimensional structure, the wavenumber, k, has two non-zero components $k_x$ and $k_y$. At the maxima or minima, the group velocity, $v_g(x,y)=0$.

Three dimensional structures introduce a further waveguide dimension, thereby introducing a $k_z$ component. This $k_z$ component behaves differently with respect to frequency when compared with the frequency dependencies for $k_x$ and $k_y$. The $k_z$ typically behaves as it would in a waveguide, so that as the $k_z$ component is increased, the frequency increases (a phenomenon that arises from typical waveguide dispersion relations), hence indicating that $v_g(z)$ is non-zero.

When the $k_z$ is superimposed on the $k_x$ and $k_y$, there no longer exists a $k_x$ and $k_y$, for which $v_g(x,y,z)=0$, because the dispersion in the z direction of k always slopes gradually up in frequency and distorts the dispersion bands (in the x and y direction). Hence, the only way to probe the $v_g(x,y,z)=0$ for a PC embedded in a waveguide is to probe the true two dimensional nature of the structure, under which circumstances the field can only propagate in a true 2D nature. Evanescent fields only ever propagate normal to the PC rods (no $k_z$ component present), so the two dimensional nature of the structure can be probed by perturbing the evanescent field.

The basic waveguide geometry can be reconfigured to provide an even more effective structure. If the mode was allowed to couple into two carefully designed thin cores (rather than a single relatively large waveguide core) a large proportion of the field can reside in the inter-core cladding region while still maintaining a symmetric node profile.

Figure 7:
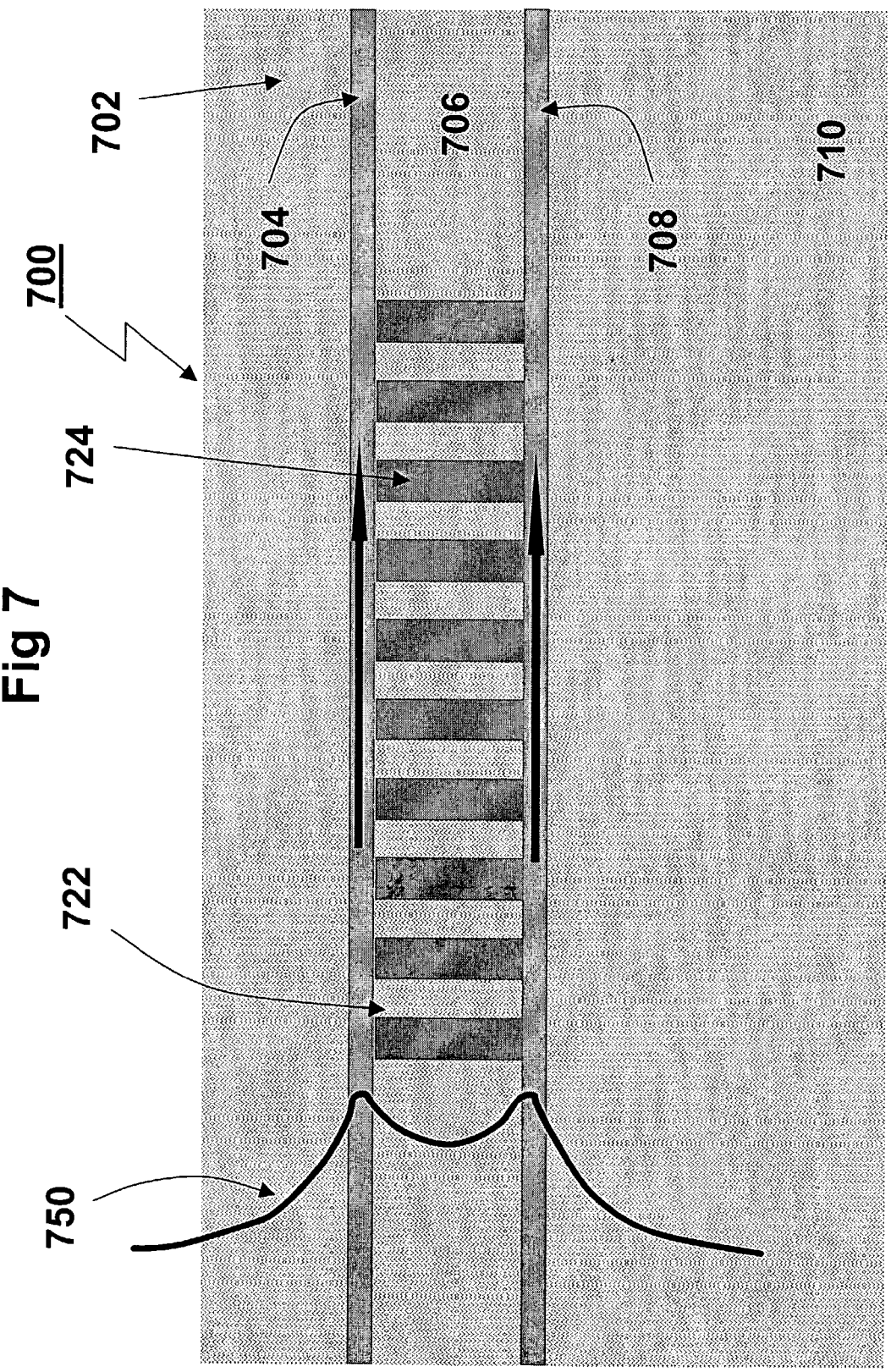
FIG. 7 shows a cross-section through a double core waveguide structure with an inter-core cladding PC in accordance with the present invention.
Figure 8:
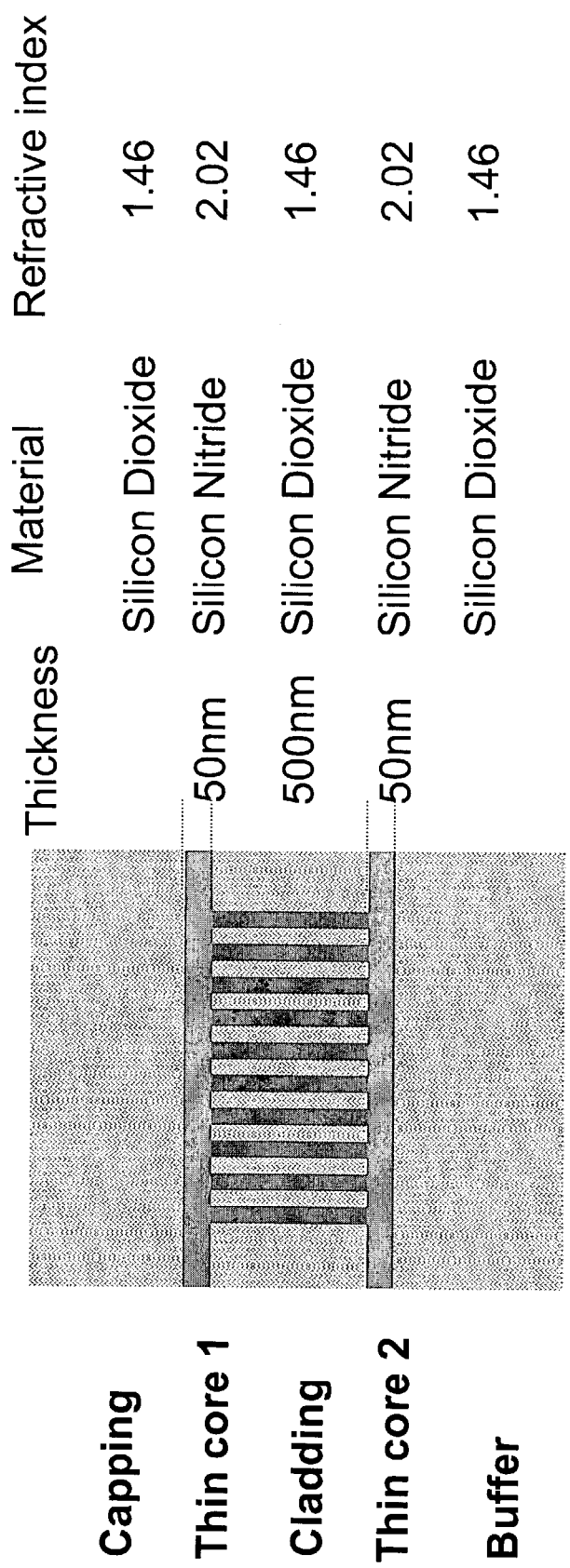
FIG. 8 shows the characteristics of the plurality of layers typically adopted in the double core waveguide structure of the present invention.

A waveguide structure based on this principle is illustrated in FIGS. 7 and 8. The waveguide structure 700 is shown in cross-section in FIG. 7. The waveguide structure 700 comprises a buffer layer 710, a first thin core layer 708, an inter-core cladding layer 706, a second thin core layer 704, and a capping layer 702. Sub-regions 720 are formed in the cladding layer 706 but not in either of the core layers 704,708. The field profile 750 varies according to whether a core/cladding 722 or a core/sub-region 724 interface is experienced in the vertical direction. The presence of a core/sub-region interface 724 pushes the field more tightly into the core layers (or extends it into the cladding, depending upon the effective index) while still maintaining strong confinement due to the symmetry of the structure.

FIG. 8 shows the characteristics of the plurality of layers typically adopted in this double core waveguide structure. The waveguide cores are 50 nm thick and formed of Silicon Nitride (refractive index: 2.02). Separating the core layers is a 500 nm Silicon Dioxide (refractive index: 1.46) cladding PC. The waveguide cores are then sandwiched between a buffer layer and a capping layer, both formed of Silicon Dioxide (refractive index: 1.46).

The PC embedded in the cladding region can be formed of either one-dimensional PC slots or a two-dimensional lattice of rods. The slots or rods can be etched in a conventional manner. They may then be left as air rods or filled with a different material. For the typical case illustrated in FIG. 8, the rods could be filled with a material such as Silicon (refractive index: 3.46). Silicon filling in the FIG. 8 waveguide structure would provide high refractive index rods in a low-index background material.

An alternative arrangement can be devised whereby the core layers are composed of Silicon and the cladding layer composed of Silicon Nitride. Using such a material system, the rods could be filled with Silicon Dioxide providing a low-index rod PC system in a high-index material background.

Figure 9:
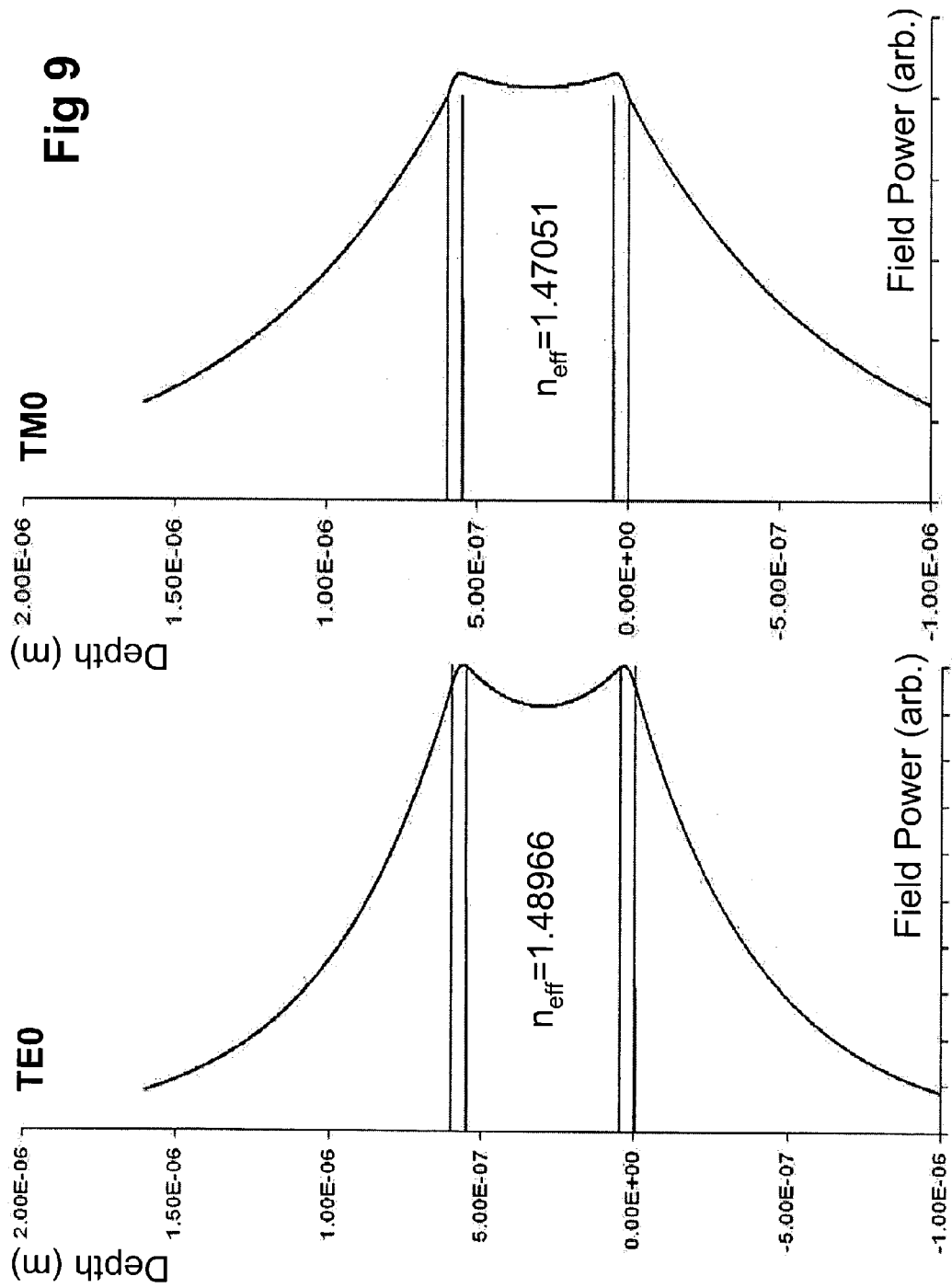
FIG. 9 illustrates the field profiles for TE0 and TM0 modes in the double core waveguide structure of FIG. 8.

FIG. 9 illustrates the field profiles for TE0 and TM0 modes in the double core waveguide structure of FIG. 8 away from the PC subregions. The field profile diagrams are graphs of field power (on a normalised scale) against the vertical depth through the cladding region. The effective refractive index for the TE0 mode is $n_{eff}=1.48966$, while for the TM0 mode it is $n_{eff}=1.4705$.

Figure 10:
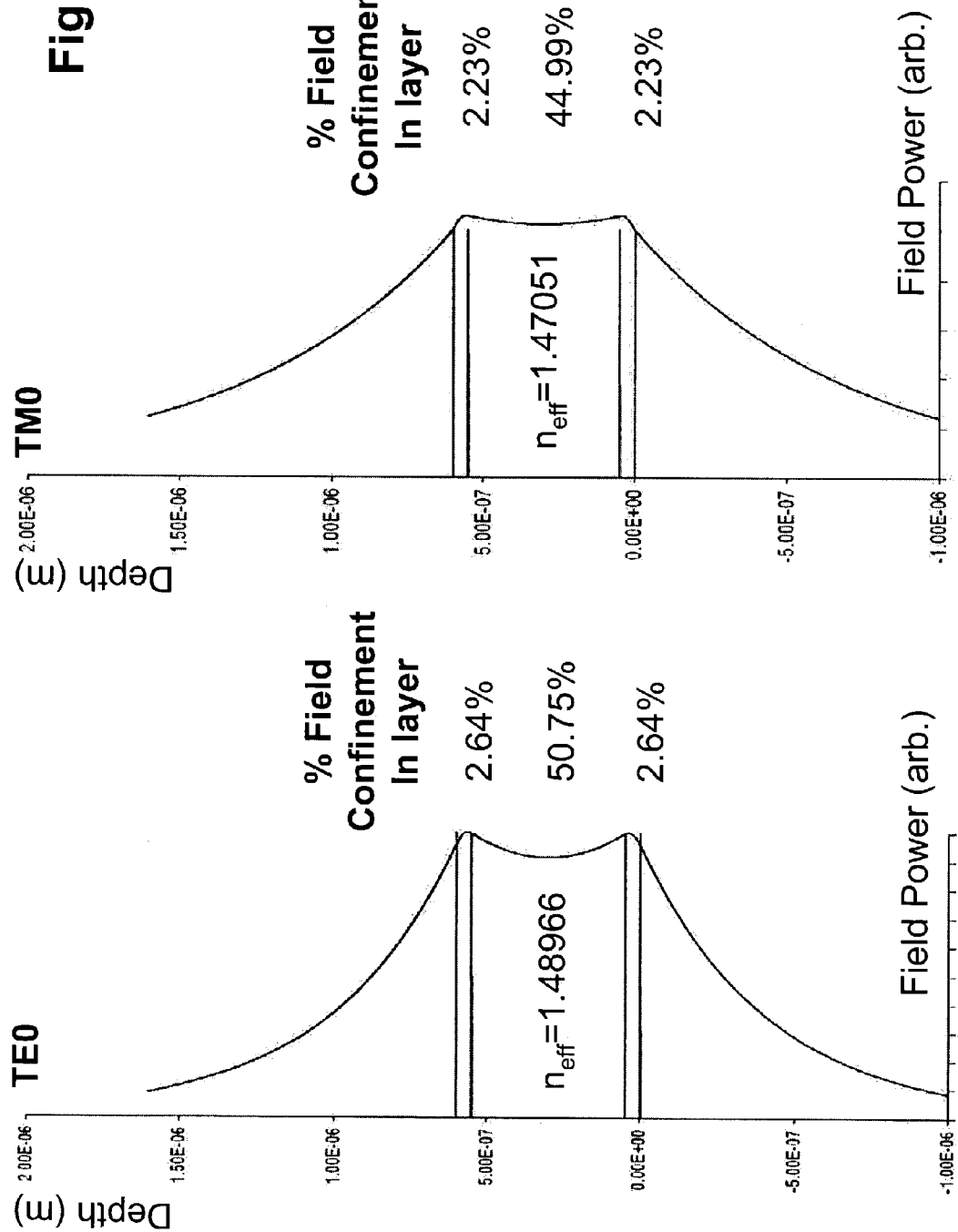
FIG. 10 illustrates the percentage field confinement in each layer of the double core waveguide structure of FIG. 8.

FIG. 10 shows the field profile diagrams with a table of the corresponding percentage field confinement in each layer of the double core waveguide structure of FIG. 8.

The percentage of the field confined in the cladding (which is surrounded by the two core layers) was calculated for the structure in FIGS. 7 and 8. The field confinement in the inter-core cladding layer is 50.75% (for the TE0 mode) and 44.99% (for the TM0 mode). The greater the field confined in the cladding region, the larger the interaction of the evanescent field with the photonic crystal. This provides greater effective dielectric contrast in the photonic crystal providing highly dispersive bands which give rise to wider and larger extinction ratio bandgaps.

Care is taken when manufacturing double core waveguide structures that an evanescent field is formed in the cladding region and not a guided mode. This limits the maximum confinement in the cladding. When the material system has been fixed, two main parameters can be varied to achieve optimal field confinement in the cladding while still maintaining the evanescent nature of the field, these are the thickness of the two cores and that of the cladding.

There now follow a number of illustrative examples of the present invention, which highlight some of the permutations of one-dimensional (1D) and two-dimensional (2D) double core cladding PC waveguide structures.

Figure 11:
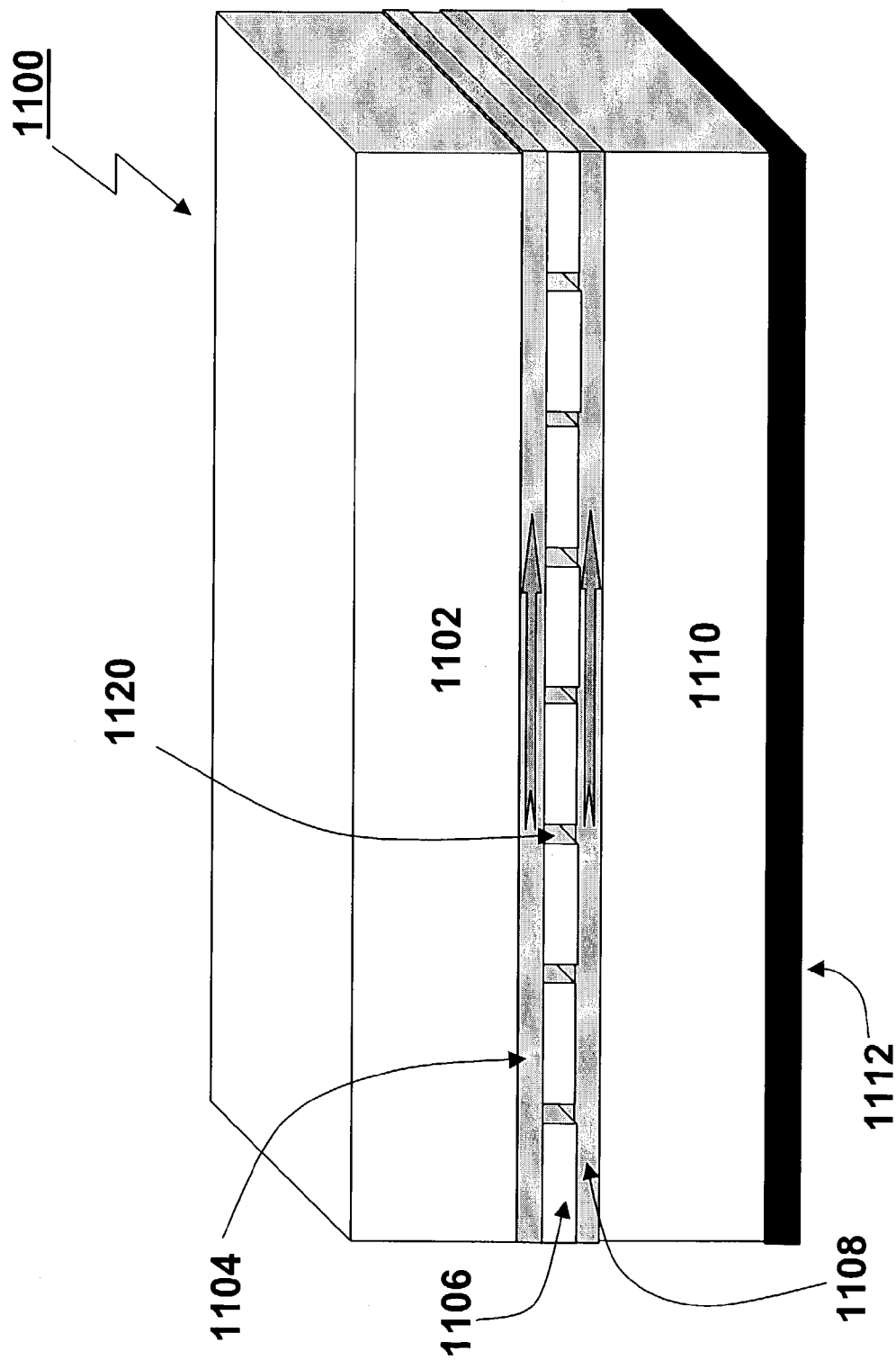
FIG. 11 shows a planar double core waveguide structure having a 1D inter-core cladding PC having air-filled slots in accordance with the present invention.

FIG. 11 shows a planar double core waveguide structure 1100 having a 1 D inter-core cladding PC having air-filled slots in accordance with the present invention. The planar waveguide structure 1100 includes a substrate 1112, a buffer layer 1110, a first core layer 1108, an inter-core cladding layer 1106, a second core layer 1104 and a capping layer 1102. The inter-core cladding layer 1106 of the waveguide structure is disposed between the first core layer 1108, and the second core layer 1104. An array of sub-regions (i.e. mutually parallel trenches) 1120 is formed in the cladding layer 1106, the trenches 1120 being aligned perpendicularly to the direction of propagation of an optical signal through the waveguide 1100. In this embodiment, the trenches (or slots) 1120 are air-filled.

Figure 12:
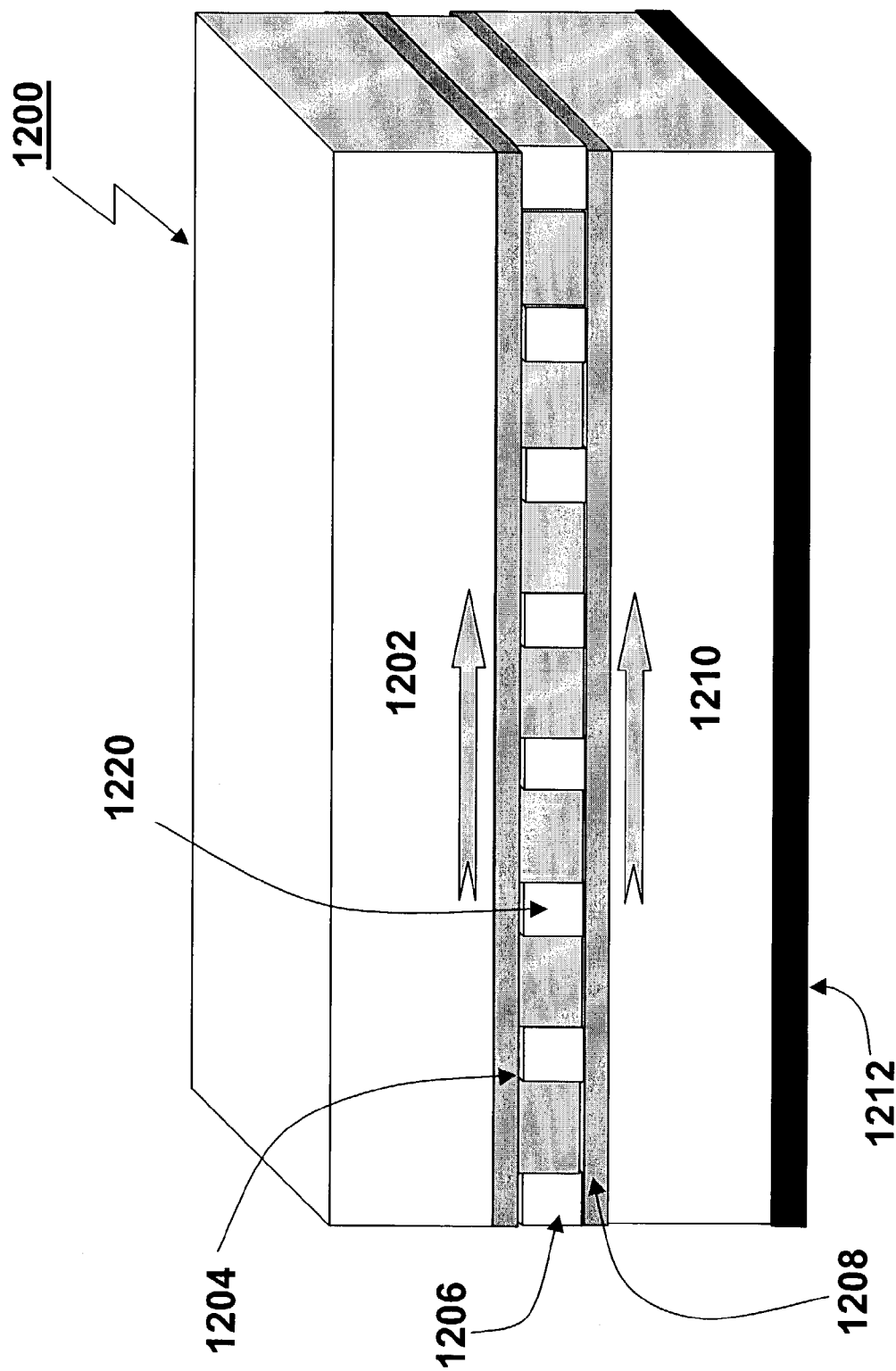
FIG. 12 shows a planar double core waveguide structure having a 1D inter-core cladding PC in accordance with the present invention, having slots filled with a filler material.

FIG. 12 shows a planar double core waveguide structure having a 1D inter-core cladding PC, having slots filled with a filler material in accordance with the present invention. The planar waveguide structure 1200 includes a substrate 1212, a buffer layer 1210, a first core layer 1208, an inter-core cladding layer 1206, a second core layer 1204 and a capping layer 1202. The inter-core cladding layer 1206 of the waveguide structure is disposed between the first core layer 1208, and the second core layer 1204. An array of sub-regions (i.e. mutually parallel trenches) 1220 is formed in the cladding layer 1206, the trenches 1220 being aligned perpendicularly to the direction of propagation of an optical signal through the waveguide 1200. In this embodiment, the trenches (or slots) 1220 are filled with a filler material, for example silicon.

Figure 13:
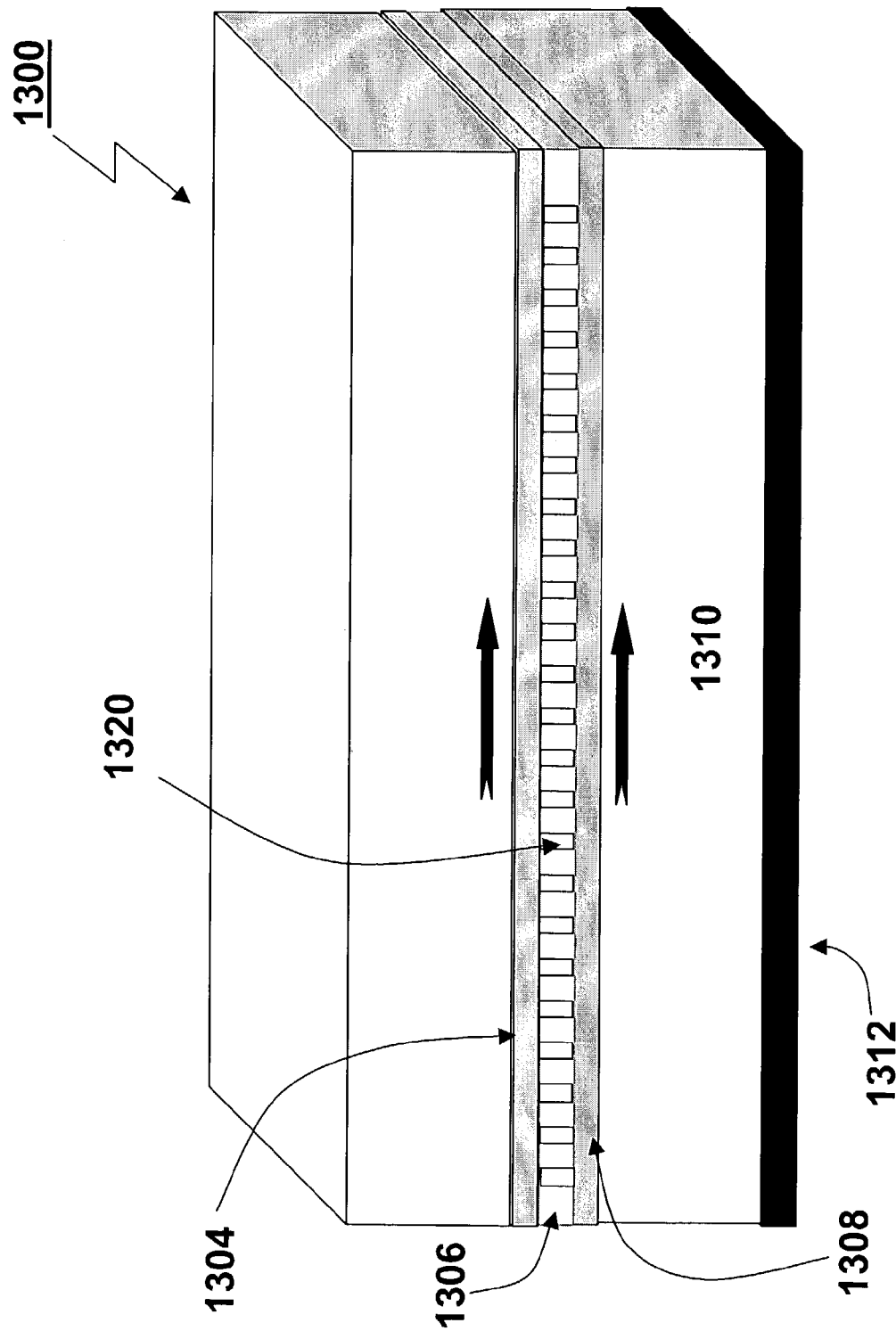
FIG. 13 shows a planar double core waveguide structure having a 2D inter-core cladding PC having air-filled rods in accordance with the present invention.

FIG. 13 shows a planar double core waveguide structure having a 2D inter-core cladding PC having air-filled rods in accordance with the present invention. The planar waveguide structure 1300 includes a substrate 1312, a buffer layer 1310, a first core layer 1308, an inter-core cladding layer 1306, a second core layer 1304 and a capping layer 1302. The inter-core cladding layer 1306 of the waveguide structure is disposed between the first core layer 1308, and the second core layer 1304. An array of sub-regions (i.e. rods) 1320 is formed in the cladding layer 1306, the rods 1320 being aligned perpendicularly to the direction of propagation of an optical signal through the waveguide 1300. In this embodiment, the rods 1320 are air-filled.

It is noted that the inter-core cladding 1106,1206,1306 can be composed of an identical material to that of the buffer, capping or core layers. Alternatively, the inter-core cladding layer could comprise material different from any of the other layers.

Figure 14:
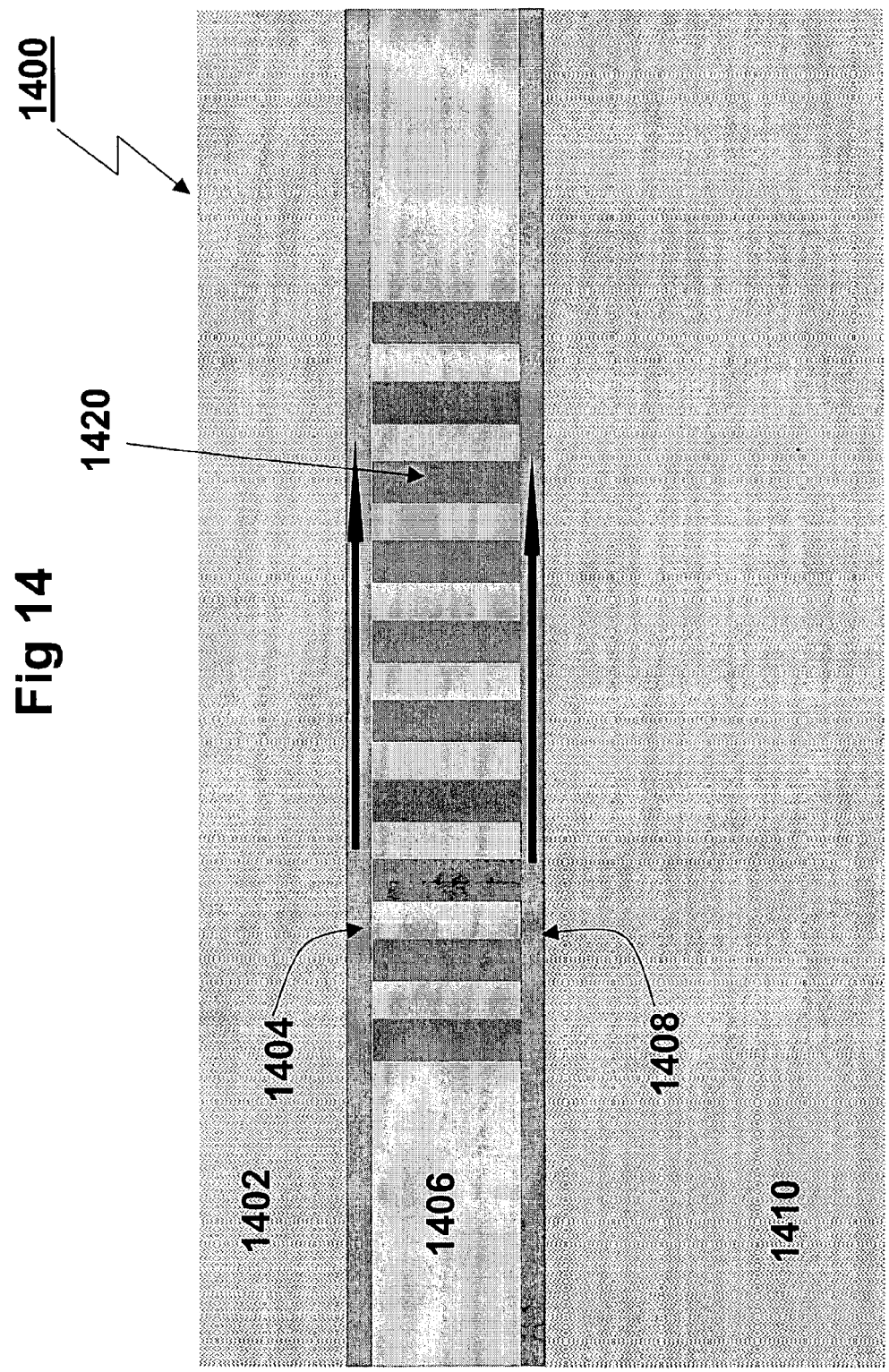
FIG. 14 shows a cross-section through a double core waveguide structure with an inter-core cladding PC in accordance with the present invention, the cladding material being different from that of the core or the buffer.

As suggested in the co-pending patent application Ser. No. 10/421,949 the cladding material refractive index in this arrangement can also be varied to confine even more of the mode in the central cladding layer and not in the buffer and capping layers. FIG. 14 sketches a possible layout of the material system and shows a cross-section through a double core waveguide structure 1400 with an inter-core cladding PC. Waveguide structure 1400 comprises a buffer layer 1410, a first thin core layer 1408, an inter-core cladding layer 1406, a second thin core layer 1404, and a capping layer 1402. Sub-regions 1420 are formed in the cladding layer 1406 but not in either of the core layers 1404,1408. Here, the cladding layer 1406 is a distinct shade, signifying that the cladding material is different from that of the core or the buffer.

However, care has to be taken to ensure that the central cladding material does not start to guide the mode. For the example shown above, if the core and cladding geometry is fixed such that each core is 50 nm thick and the inter-core cladding is 500 nm thick, as they are in FIG. 8, the refractive index of the cladding can be pushed up to n=1.473 (by using Silicon Oxynitride as the cladding material) while still maintaining confinement in the cores.

Figure 15:
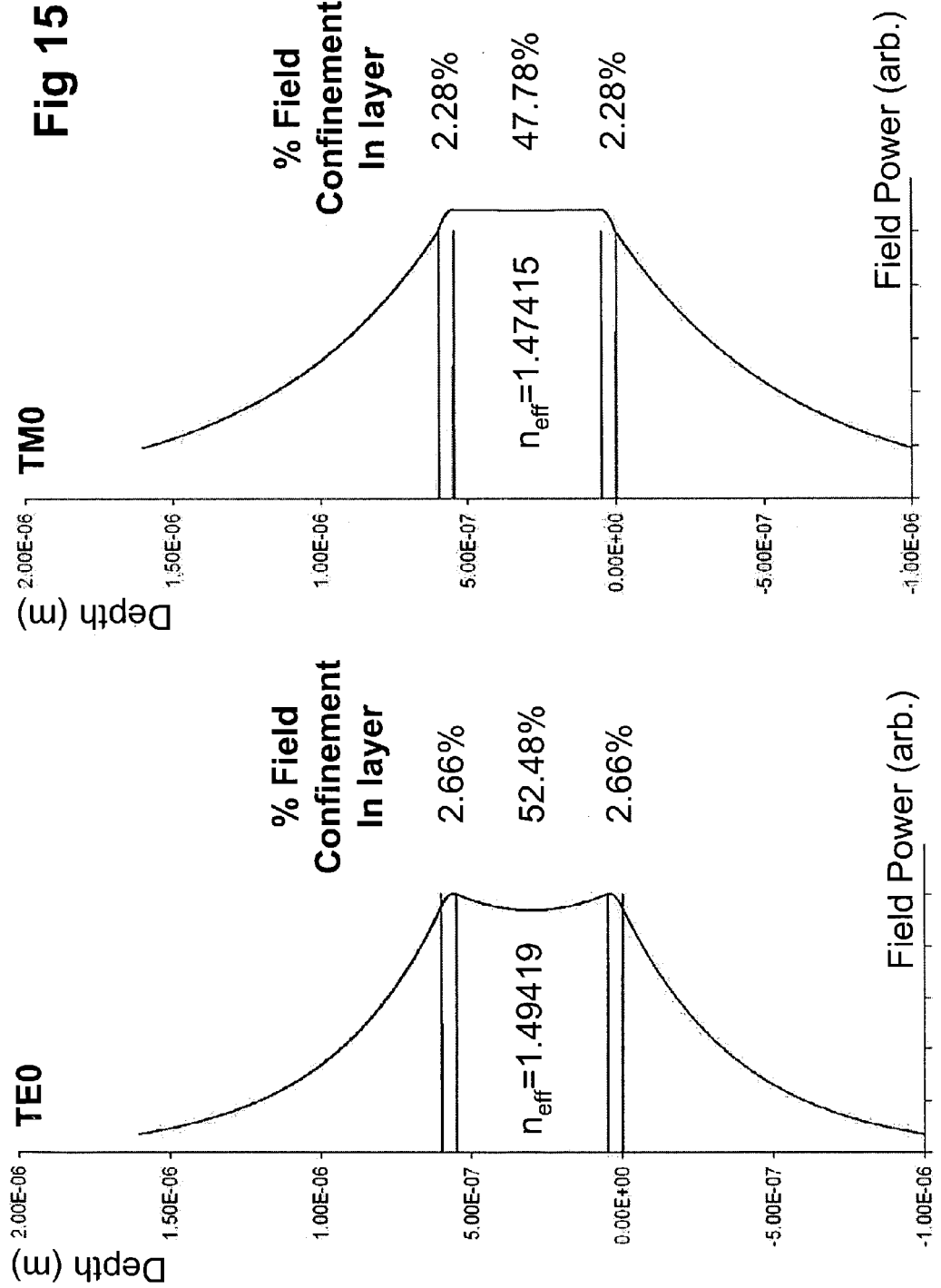
FIG. 15 illustrates the field profiles for TE0 and TM0 modes and percentage field confinement in each layer of the double core waveguide structure of FIG. 14.

FIG. 15 illustrates both the field profiles for TE0 and TM0 modes and percentage field confinement in each layer of the double core waveguide structure of FIG. 14. An increase in confinement in the cladding, corresponding to the use of Silicon Oxynitride as the cladding material, may be observed. The confinement of the TE0 field increases from 50.75% to 52.48%, while in the TM0 case the increase is from 44.99% to 47.78%.

Figure 16:
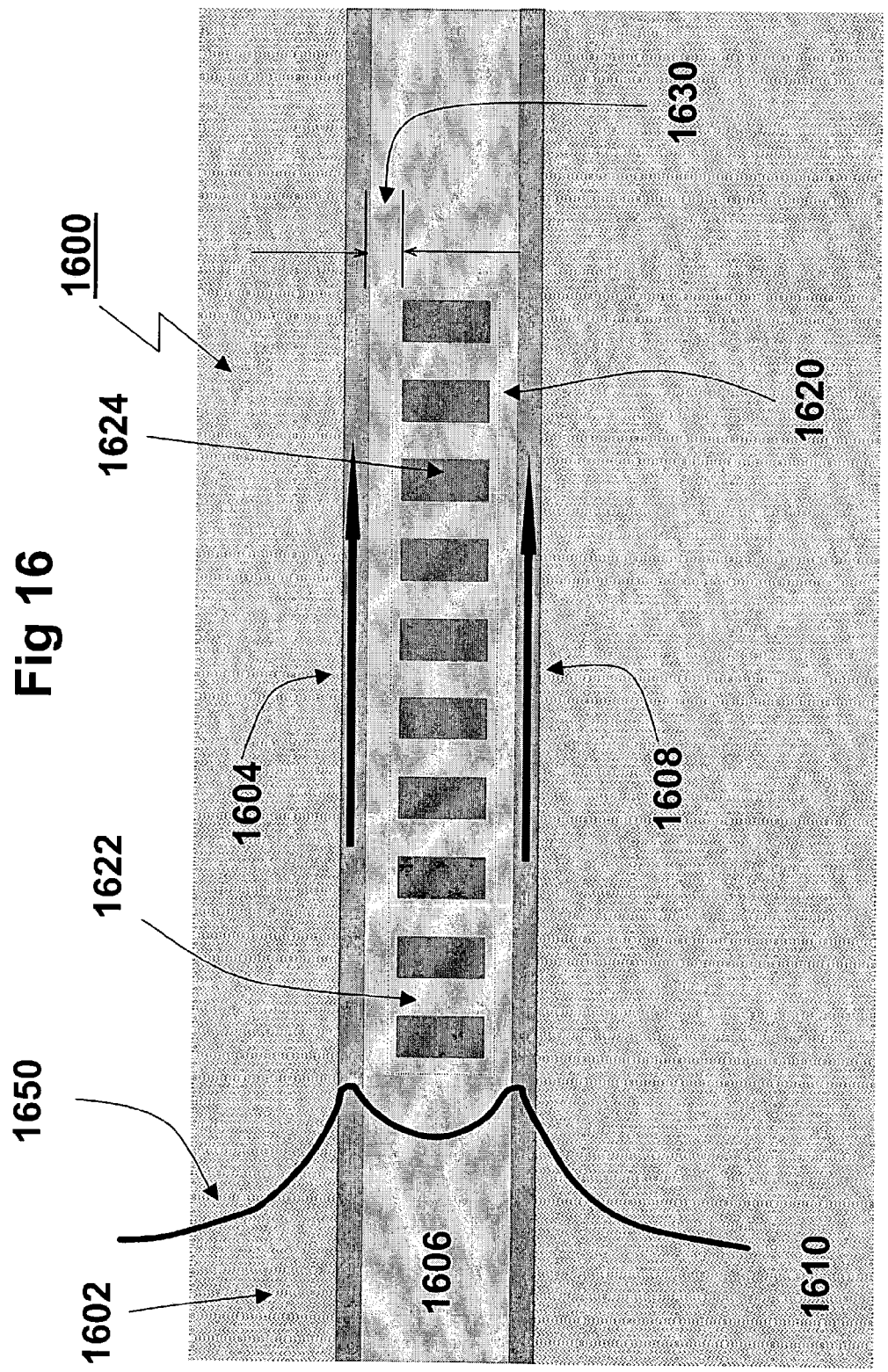
FIG. 16 shows a cross-section through a double core waveguide structure with an inter-core cladding PC and "clearances" in accordance with the present invention.

When making such structures, it is possible to introduce a clearance between the cladding PC and the thin cores. Generally, clearances are a result of etching to a predetermined depth. The provision of clearances is illustrated in FIG. 16. An increase in the clearance corresponds to a reduction in the effective mode index perturbation experienced in the thin cores. This provides narrower bandgaps and weaker extinction ratios for the same number of rods, thereby providing an extra factor for fine tuning the dispersion relation features.

FIG. 16 shows a cross-section through a double core waveguide structure 1600 with an inter-core cladding PC 1620 and "clearances" 1630. The waveguide structure 1600 comprises a buffer layer 1610, a first thin core layer 1608, an inter-core cladding layer 1606, a second thin core layer 1604, and a capping layer 1602. The sub-regions 1620 are formed in the cladding layer 1606 but not in either of the core layers 1604,1608. Here, the cladding layer 1606 may be formed of the same material as either the buffer, the capping or the core layer: it may also be formed of a different material from that of the core, capping or buffer. The clearances 1630 provide a further parameter by which the effect on the field profile of the inter-core cladding PC can be tuned.

Many additional parameters can be varied. In one class of embodiment, asymmetrical waveguide structures are provided wherein the thin cores are arranged to have different thicknesses or refractive indexes. These asymmetrical structures can be optimised for the reduction of waveguide losses (for example, in the wavelength range characteristic for telecommunications—1.500 $\mu$m to 1.600 $\mu$m) while still maintaining thin buffer layers, without the need for thick cores that could give rise to multi-moded behaviour. Asymmetrical waveguide structures may also be optimised to maintain a high field confinement factor in the cladding and hence still provide large effective index perturbations leading to large partial or complete photonic bandgaps and strong dispersion.

Figure 17:
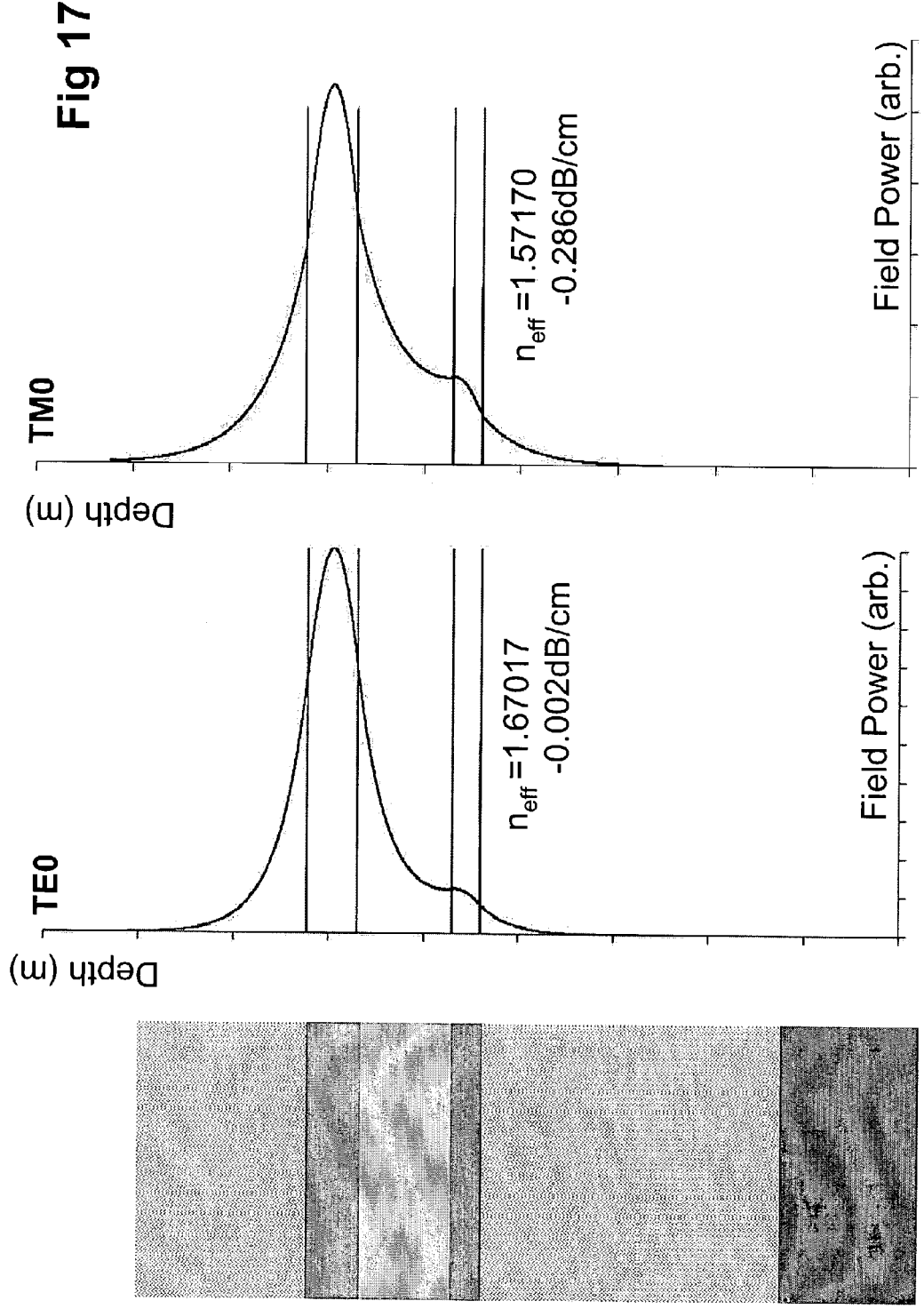
FIG. 17 shows an asymmetric double core waveguide structure in accordance with a further aspect of the present invention and illustrates the corresponding field profiles for TE0 and TM0 modes.

FIG. 17 shows an asymmetric double core waveguide structure in accordance with a further aspect of the present invention and illustrates the corresponding field profiles for TE0 and TM0 modes. In this example, the materials used in each layer are the same as those in FIG. 8. The waveguide structures differ in that the asymmetric structure has a top core of thickness 260 nm and a lower core thickness of 150 nm and a relatively thin buffer layer of thickness 2.2 $\mu$m, and the waveguide loss for the TE0 mode can thereby be reduced from 10.388 dB/cm (shown in FIG. 9) to 0.002 dB/cm (with an asymmetric structure). Where both lower and upper cores are 150 nm thick and an inter-core cladding of 500 nm, the waveguide loss for the TE0 mode is 0.119 dB/cm.

Additionally or alternatively, shifting the field more into the top core can be similarly achieved by varying the refractive index of the core materials as opposed to the thickness of the core layers. Hence, the top core material can be of a higher refractive index (e.g. silicon) compared to the lower core, while still maintaining the thin double core architecture.

Figure 18:
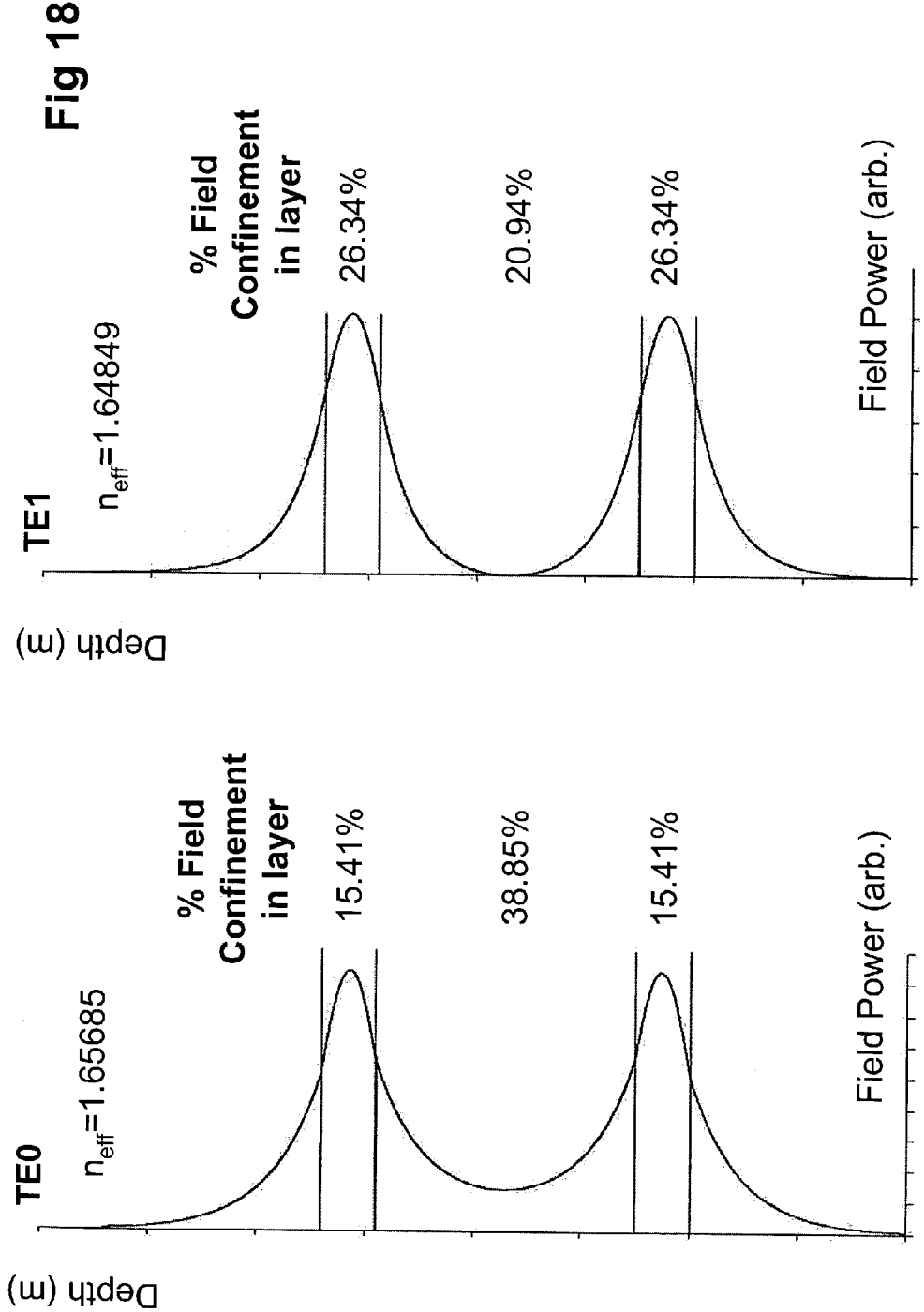
FIG. 18 illustrates the field profiles for TE0 and TE1 modes and percentage field confinement in each layer of a multimoded double core waveguide structure.

It is also possible to provide double core waveguide structures suitable for accommodating high power applications by having thicker multi-mode waveguides. In conventional waveguide designs, the waveguide dispersion pattern for the different modes is very different and causes problems in the manufacture of optical devices incorporated in the waveguide. Double core waveguides permit the maintenance of the multi-mode nature of the waveguide, while also providing nearly identical effective indexes and field profiles, for the different orders of modes, as shown in FIG. 18. Furthermore, these double waveguides can still remain relatively thin, and hence easier to fabricate with reduced fabrication tolerances. As all the modes possess similar characteristics, a cladding PC will interact with all the modes in a similar way.

FIG. 18 illustrates the field profiles for TE0 and TE1 modes and percentage field confinement in each layer of a multimoded double core waveguide structure and highlights the similarity of the TE0 and TE1 modes. The thicknesses of the layers in this multimoded waveguide structure are as follows: cores=250 nm, inter-core cladding=1200 nm, and buffer=2200 nm. The materials used in each layer of the illustrated embodiment are identical to those in corresponding layers of the structure of FIG. 8.

As alluded to above, one important factor in the design of waveguides is the reduction of waveguide dispersion losses throughout the telecommunications wavelength range. Reduced dispersion losses improve distortion and noise levels.

The double core waveguide structure compares well against conventional single-moded waveguide architectures. The waveguide dispersion for the double core waveguide in the telecommunications wavelength range was calculated to be 4.9 times lower than that of a conventional single core waveguide having a 100 nm thick core (the same thickness as both waveguides of the double core waveguide combined). If this dispersion is compared to a different type of conventional waveguide (a SOI planar waveguide) composed of a 4 $\mu$m silicon core (which suffer from multi-mode behaviour), the thick cores are seen to be only 1.8 times less dispersive. Note that 4 $\mu$m is very thick by comparison to the cores in the double core architecture—of the order of 40 times thicker.

Due to the highly symmetric nature of the devices, out-of-plane losses are greatly reduced, while still maintaining strong perturbations of the field. Furthermore, the evanescent field is perturbed and hence less out-of-plane diffraction is experienced.

Further permutations of the present invention include double core waveguide structures (with or without clearances) having PCs in the capping and/or at least partially into the buffer layer. Structures having PCs in more than one layer perturb even more of the field and provide a stronger extinction ratio bandgap and stronger dispersion for the same number of rows of PC trenches or rods.

As will be appreciated from the discussion in co-pending application Ser. No. 10/421,949 many different parameters can be used to vary the performance and functionality of PC devices. Suitable parameters include: introduction and variation of a clearance between the different PCs; the ability to phase shift the different PCs with respect to each other; filling the PCs with different materials (e.g. silicon oxynitride); varying pitch of different PCs; varying lattice geometry; varying filling fraction of the PC; grading the PCs; and introducing 1D and 2D PCs for different layers. FIGS. 19 to 25 show a number of examples of waveguide structures illustrating the variation of one or more of the above parameters.

Figure 19:
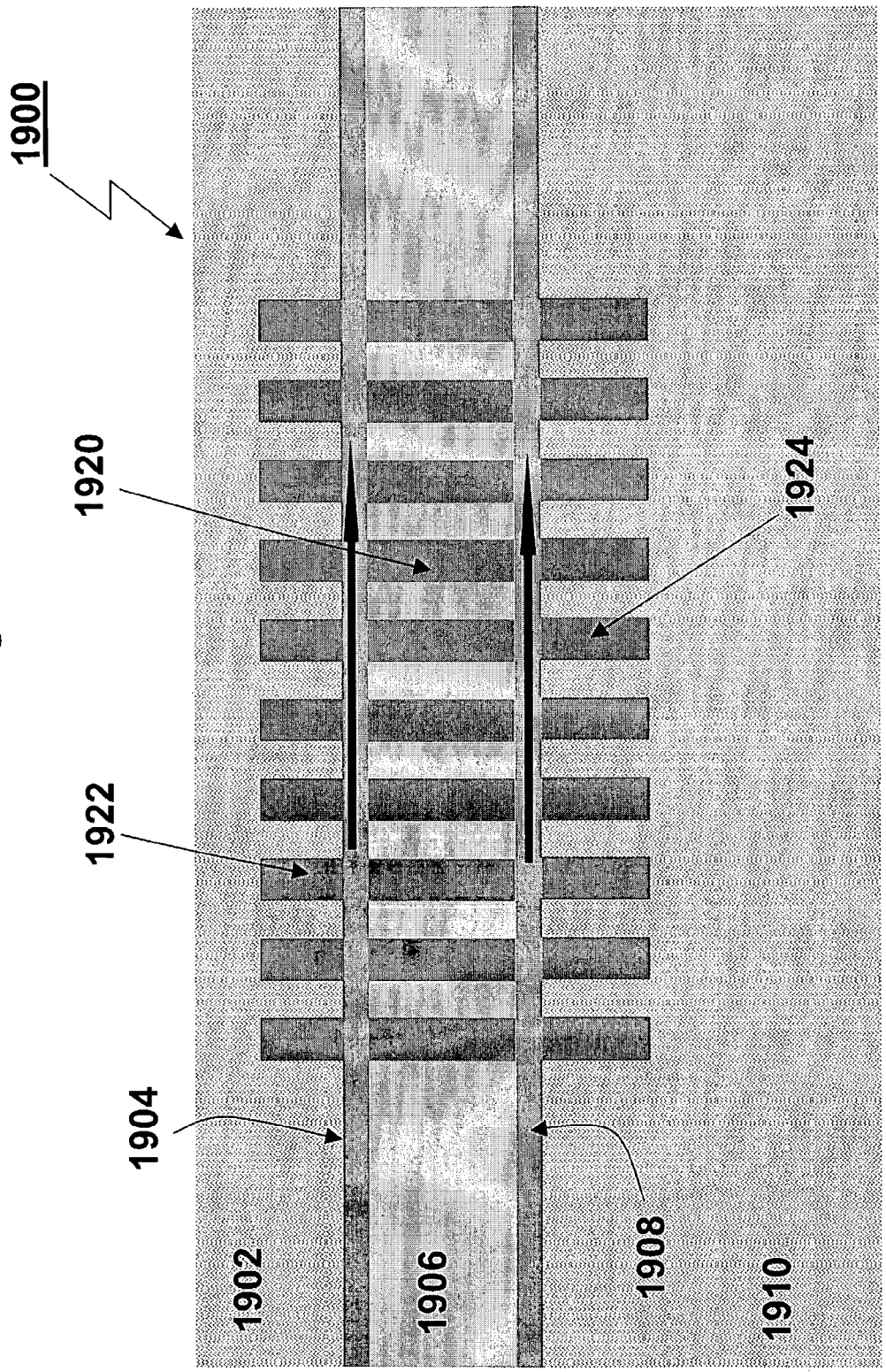
FIG. 19 shows a cross-section through a double core waveguide structure in accordance with the present invention with an inter-core cladding layer PC, a capping layer PC and a buffer layer PC.

FIG. 19 shows a cross-section through a double core waveguide structure 1900 in accordance with the present invention with an inter-core cladding layer PC 1920, a capping layer PC 1922 and a buffer layer PC 1924.

Waveguide structure 1900 comprises a buffer layer 1910, a first thin core layer 1908, an inter-core cladding layer 1906, a second thin core layer 1904, and a capping layer 1902. Sub-regions (which may be trenches or rods) 1920, 1922,1924 are formed in the cladding layer 1906, the capping layer 1902, and the buffer layer 1910 respectively, but not in either of the core layers 1904,1908. Here, no clearances are illustrated. The cladding layer 1906 is a darker shade, signifying that the cladding material may be different from that of the cores, the capping or the buffer.

Figure 20:
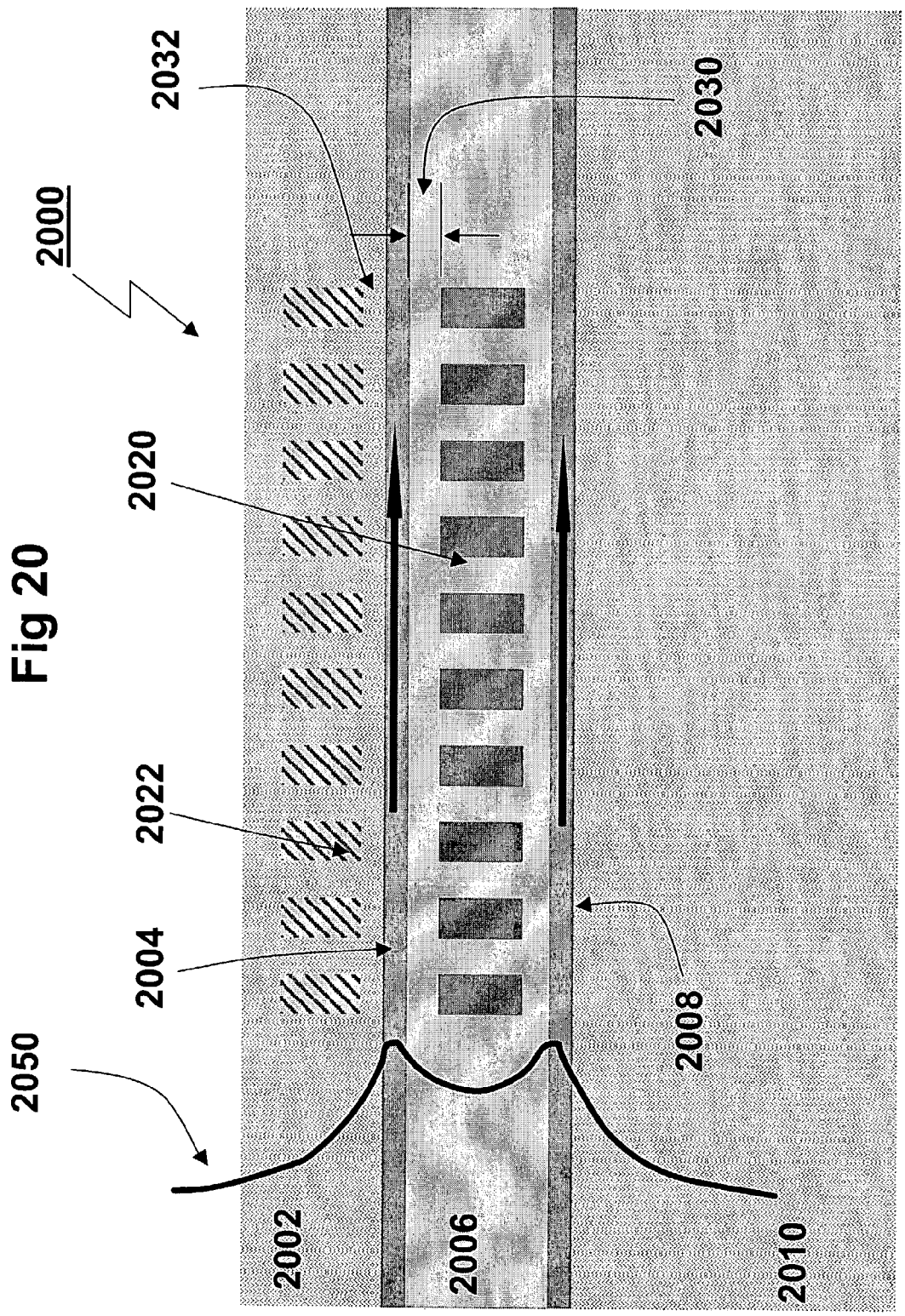
FIG. 20 shows a cross-section through a double core waveguide structure in accordance with the present invention with an inter-core cladding PC, a capping layer PC, each PC incorporating "clearances"

FIG. 20 shows a cross-section through a double core waveguide structure 2000 in accordance with the present invention with an inter-core cladding PC 2006, a capping layer PC, each PC incorporating "clearances" 2030,2032.

Waveguide structure 2000 comprises a buffer layer 2010, a first thin core layer 2008, an inter-core cladding layer 2006, a second thin core layer 2004, and a capping layer 2002. Sub-regions (which may be trenches or rods) 2020, 2022 are formed in the cladding layer 2006 and the capping layer 2002 respectively, but not in either of the core layers 2004,2008. Each PC incorporates "clearances" 2030,2032: the clearance 2032 in the capping layer is generally different from the clearance 2030 in the inter-core cladding layer.

Figure 21:
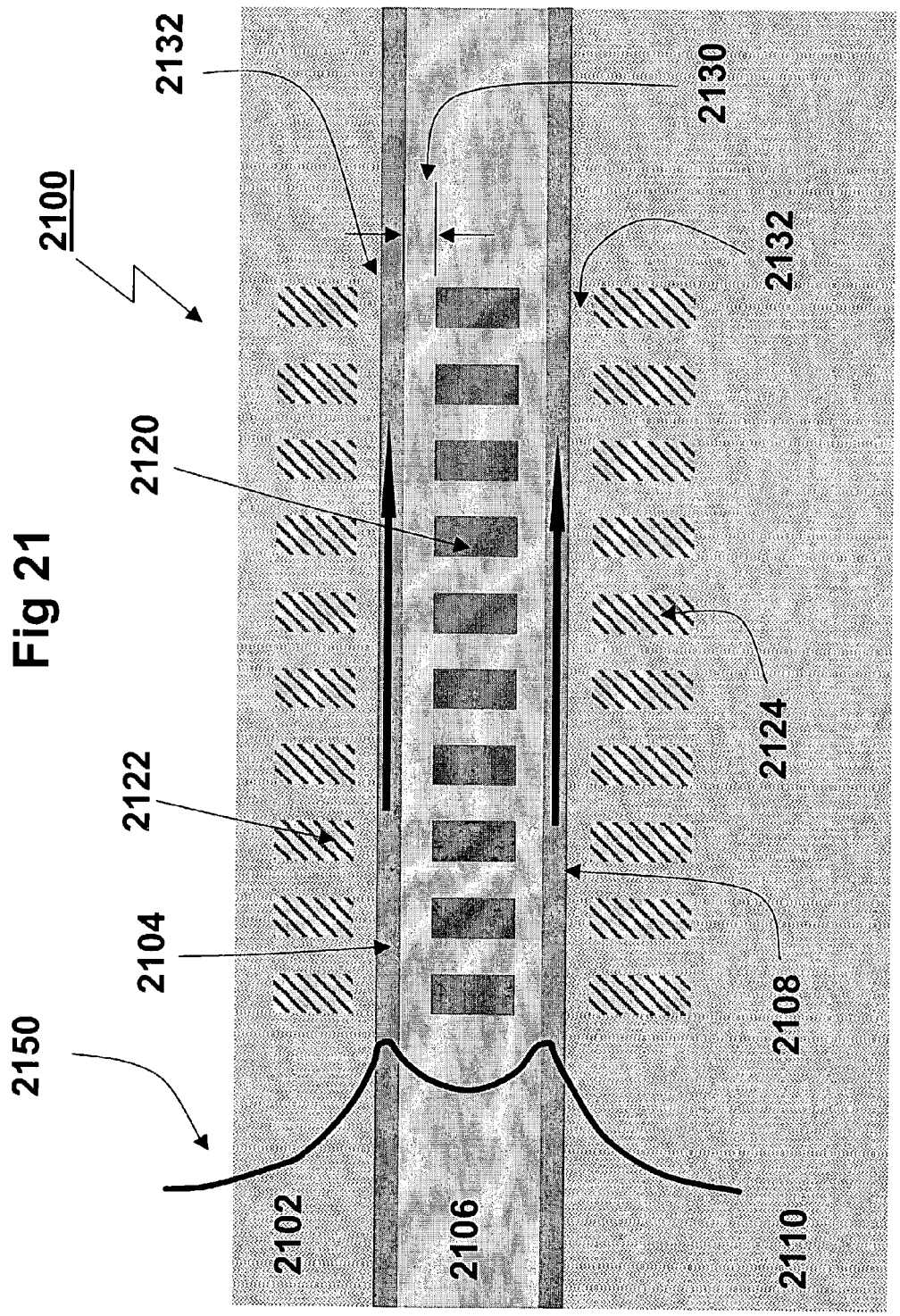
FIG. 21 shows a cross-section through a double core waveguide structure in accordance with the present invention with an inter-core cladding layer PC, a capping layer PC and a buffer layer PC, each PC incorporating "clearances"

FIG. 21 shows a cross-section through a double core waveguide structure 2100 in accordance with the present invention with an inter-core cladding layer PC, a capping layer PC and a buffer layer PC, each PC incorporating "clearances";

Waveguide structure 2100 comprises a buffer layer 2110, a first thin core layer 2108, an inter-core cladding layer 2106, a second thin core layer 2104, and a capping layer 2102. Sub-regions (which may be trenches or rods) 2120, 2122,2124 are formed in the cladding layer 2106, the capping layer 2102 and the buffer layer 2110 respectively, but not in either of the core layers 2104,2108. Each PC incorporates clearances 2130,2132,2134: the clearance 2132 in the capping layer, the clearance 2134 in the buffer layer and the clearance 2130 in the inter-core cladding layer are generally different from one another.

The architecture of the waveguide structures in accordance with the present invention are not restricted to layers composed of a single material. The cores of the double core waveguide can equally well be composed of diffused or graded compositions.

Diffused waveguides and graded index waveguides are both composed of materials with a continually varying refractive index along the profile of the waveguide. The diffused waveguide is typically formed by diffusing an ion into a bulk dielectric material. The diffused ion will increase the refractive index of the dielectric material, and will form a ramped refractive index that follows the diffusion doping of the ion in the material. The ramping of the dielectric constant will provide a means of confining the light.

Graded index waveguides, on the other hand, are based on a material system that can be graded in refractive index as it is being deposited. Consider, for example, the mixture of Silicon Dioxide (n=1.46) and Silicon Nitride (n=2.02) known as Silicon Oxynitride or SION. The composition of SION varies as the relative proportions of the constituents vary. In a waveguide manufactured from SION, it is possible to deposit SION that is initially composed of substantially pure Silicon Dioxide (giving a low index buffer), and then, as further layers of SION are added, to increase the relative proportion of Silicon Nitride, with its higher refractive index, until the SION is composed of substantially pure Silicon Nitride, so that the pure Silicon Nitride region of the SION waveguide has a higher refractive index and acts as a core.

Figure 22:
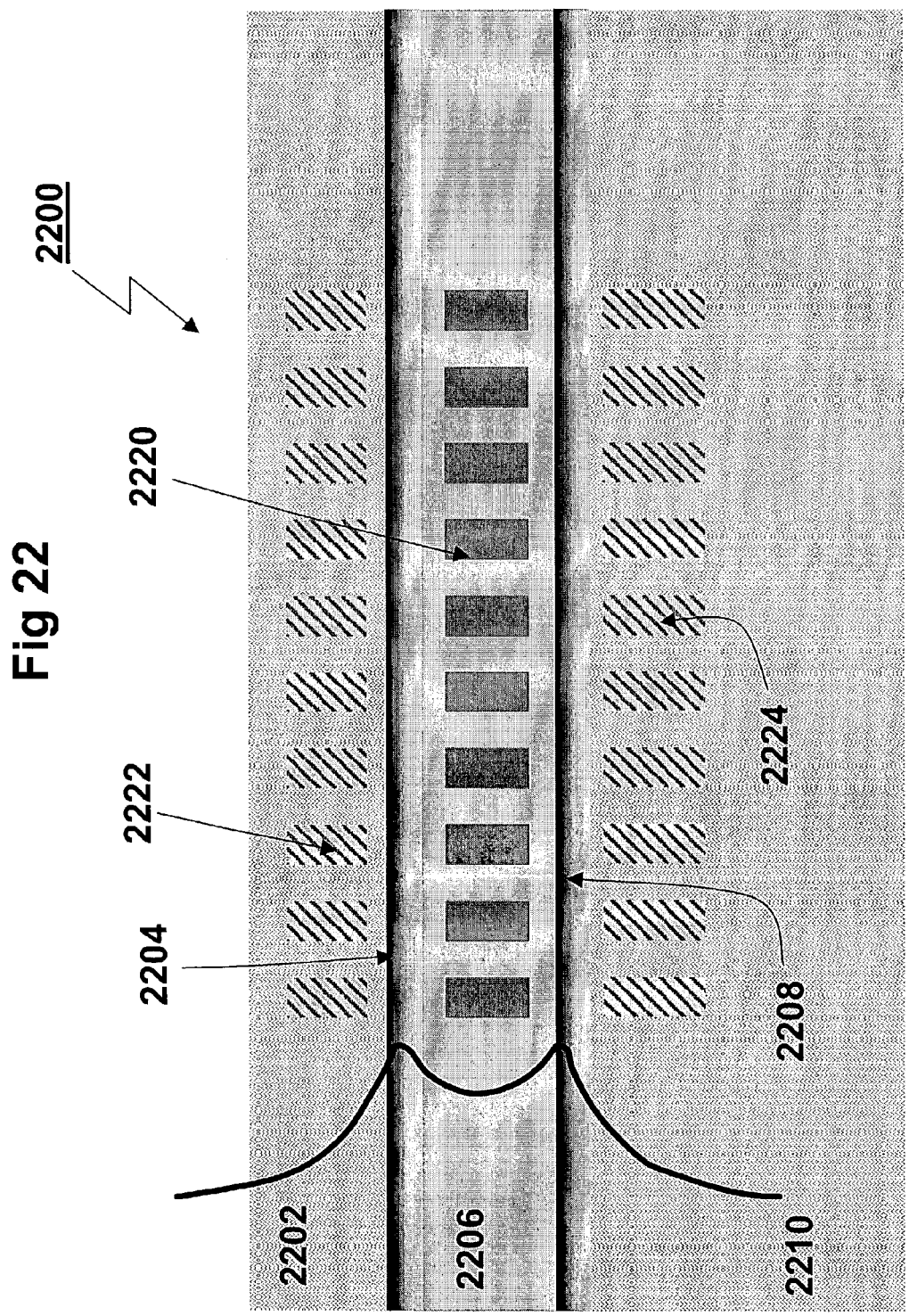
FIG. 22 shows a cross-section through a double core waveguide structure in accordance with the present invention with an inter-core cladding layer PC, a capping layer PC and a buffer layer PC, each PC incorporating "clearances" and the core being diffused.

FIG. 22 shows a cross-section through a double core waveguide structure 2200 in accordance with the present invention with an inter-core cladding layer PC, a capping layer PC and a buffer layer PC, wherein each PC incorporates clearances and the core is diffused.

Waveguide structure 2200 comprises a buffer layer 2210, a first thin core layer 2208, an inter-core cladding layer 2206, a second thin core layer 2204, and a capping layer 2202. Sub-regions (which may be trenches or rods) 2220, 2222,2224 are formed in the cladding layer 2206, the capping layer 2202 and the buffer layer 2210 respectively, but not in either of the core layers 2204,2208. Each PC incorporates clearances 2230,2232,2234: the clearance 2232 in the capping layer, the clearance 2234 in the buffer layer and the clearance 2230 in the inter-core cladding layer are generally different from one another.

Figure 23:
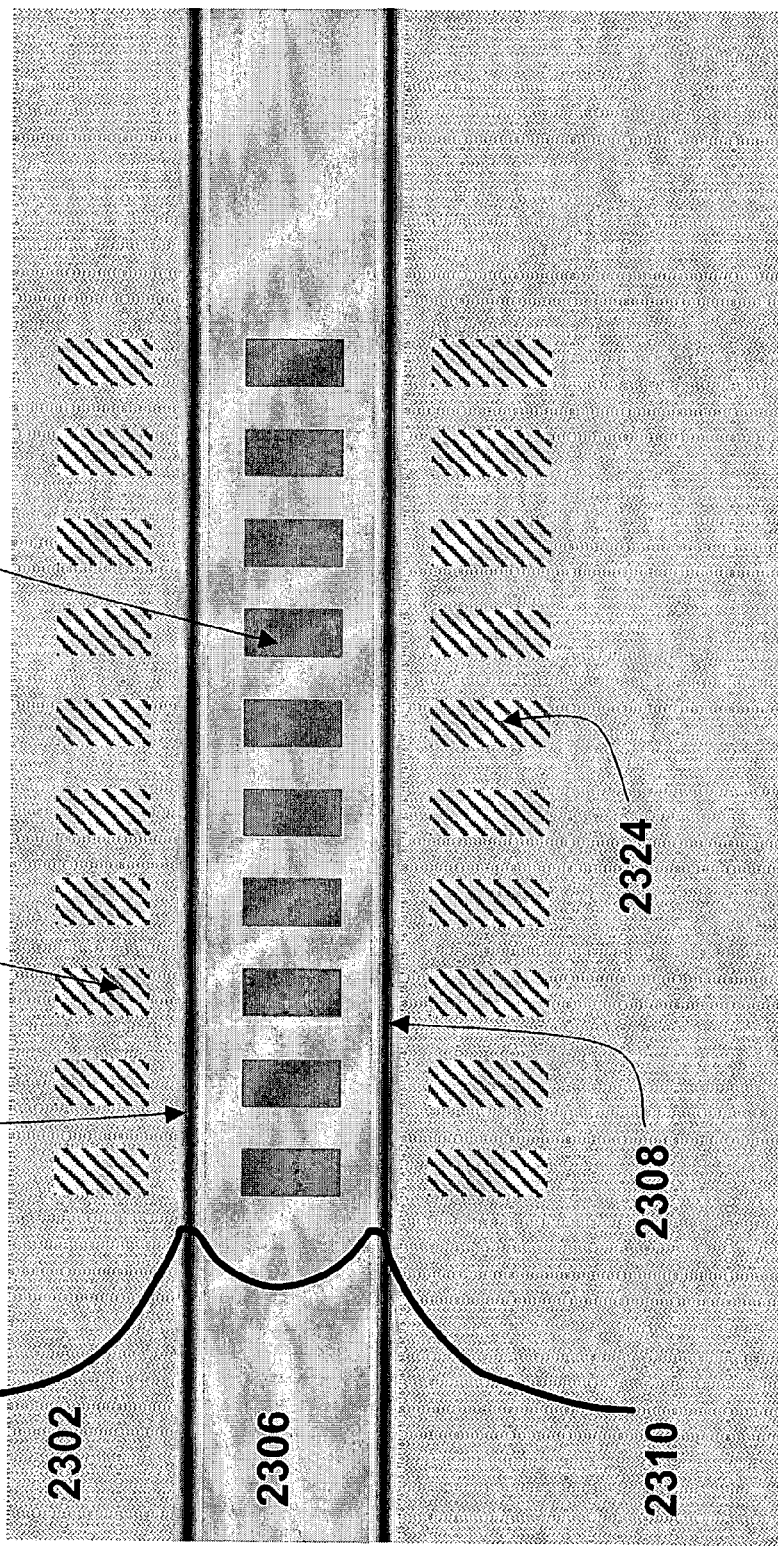
FIG. 23 shows a cross-section through a double core waveguide structure in accordance with the present invention with an inter-core cladding layer PC, a capping layer PC and a buffer layer PC, each PC incorporating "clearances" and the core being graded.

FIG. 23 shows a cross-section through a double core waveguide structure 2100 in accordance with the present invention with an inter-core cladding layer PC, a capping layer PC and a buffer layer PC, wherein each PC incorporates "clearances" and the core is graded.

Waveguide structure 2300 comprises a buffer layer 2310, a first thin core layer 2308, an inter-core cladding layer 2306, a second thin core layer 2304, and a capping layer 2302. Sub-regions (which may be trenches or rods) 2320, 2322,2324 are formed in the cladding layer 2306, the capping layer 2302 and the buffer layer 2310 respectively, but not in either of the core layers 2304,2308. Each PC incorporates clearances 2330,2332,2334: the clearance 2332 in the capping layer, the clearance 2334 in the buffer layer and the clearance 2330 in the inter-core cladding layer are generally different from one another.

Figure 24:
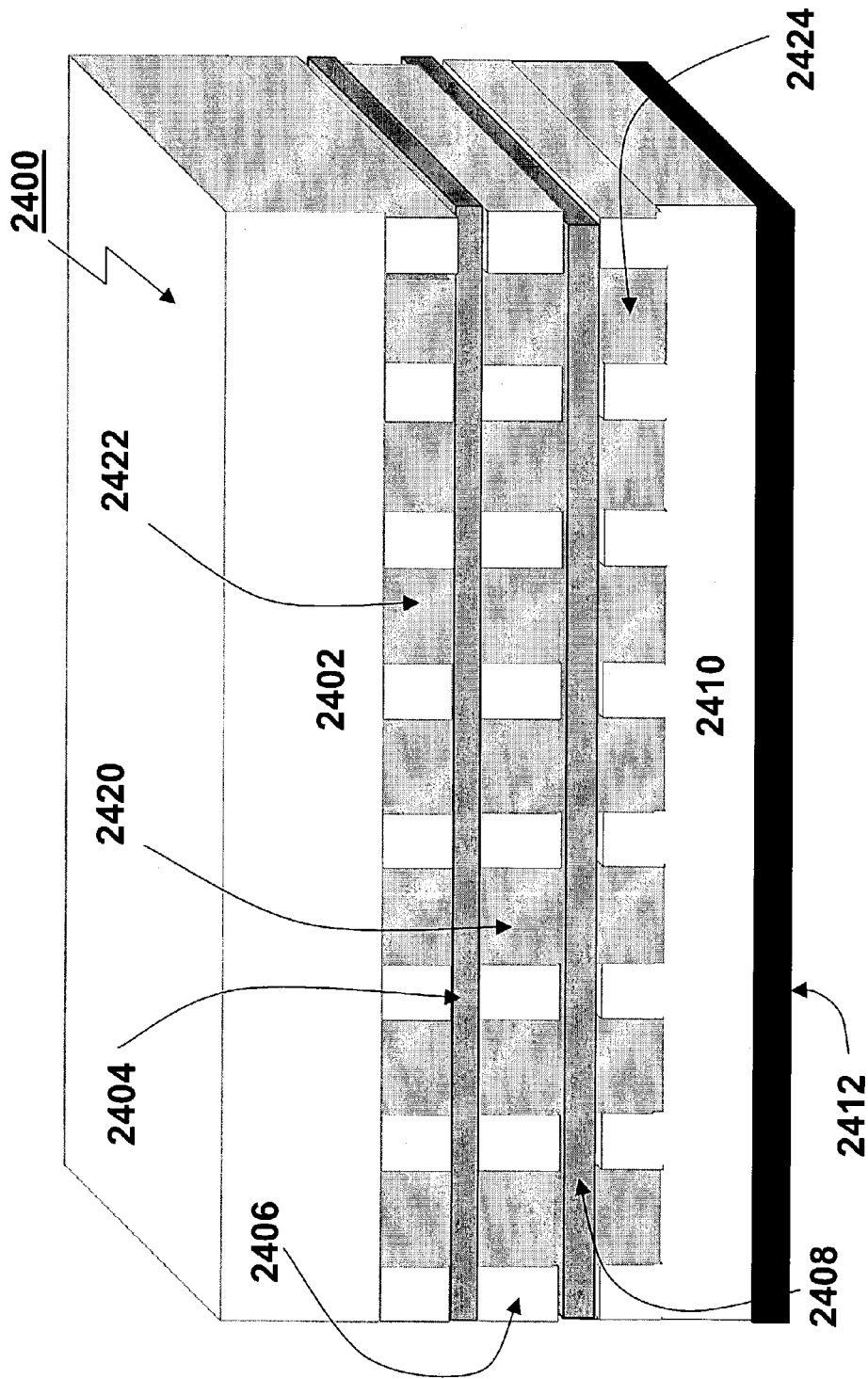
FIG. 24 shows a planar double core waveguide structure in accordance with the present invention having a 1D inter-core cladding PC, a capping layer PC and a buffer layer PC, each PC having slots filled with a filler material.

FIG. 24 shows a planar double core waveguide structure 2400 in accordance with the present invention having a 1D inter-core cladding PC, a capping layer PC and a buffer layer PC, each PC having slots filled with a filler material.

The planar waveguide structure 2400 includes a substrate 2412, a buffer layer 2410, a first core layer 2408, an inter-core cladding layer 2406, a second core layer 2404 and a capping layer 2402. The inter-core cladding layer 2406 of the waveguide structure is disposed between the first core layer 2408, and the second core layer 2404. Arrays of sub-regions (i.e. mutually parallel trenches) 2420,2422,2424 are formed in the cladding layer 2406, the capping layer 2402 and the buffer layer 2410, the trenches 2420,2422,2424 being aligned perpendicularly to the direction of propagation of an optical signal through the waveguide 2400. In this embodiment, the trenches (or slots) 2420,2422,2424 are filled with a filler material, for example silicon.

Figure 25:
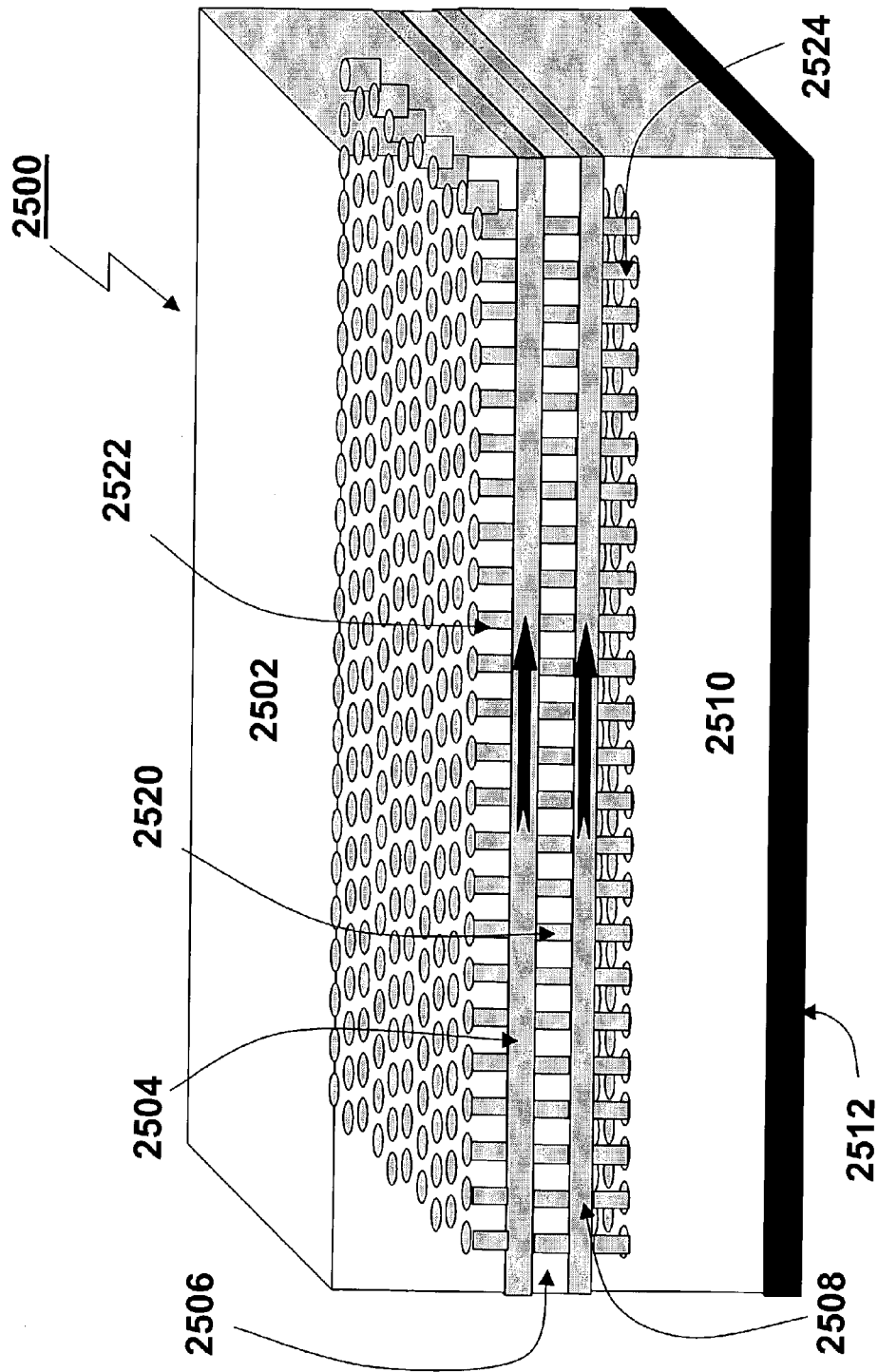
FIG. 25 shows a planar double core waveguide structure in accordance with the present invention having a 2D inter-core cladding PC, a capping layer PC and a buffer layer PC, each PC having slots filled with a filler material.

FIG. 25 shows a planar double core waveguide structure 2500 in accordance with the present invention having a 2D inter-core cladding PC, a capping layer PC and a buffer layer PC, each PC having slots filled with a filler material.

The planar waveguide structure 2500 includes a substrate 2512, a buffer layer 2510, a first core layer 2508, an inter-core cladding layer 2506, a second core layer 2504 and a capping layer 2502. The inter-core cladding layer 2506 of the waveguide structure is disposed between the first core layer 2508, and the second core layer 2504. Arrays of sub-regions (i.e. rods) 2520,2522,2524 are formed in the cladding layer 2506, the capping layer 2502 and the buffer layer 2510, the rods 2520,2522,2524 being aligned perpendicularly to the direction of propagation of an optical signal through the waveguide 2500. In this embodiment too, the rods 2520 are filled with a filler material.

Again, it is emphasised that the inter-core cladding 2406, 2506 can be composed of an identical material to that of the buffer, capping or core layers. Alternatively, the inter-core cladding layer could comprise material different from any of the other layers.

Any waveguide structure in a practical optical device is constrained by the need to have light propagating from one part of the device to the other with minimal loss. Conventional waveguide designs exploit a wide range of interconnection techniques, including rib structures, ridges, diffused and ion-exchange waveguides for the efficient interconnection of integrated optical devices. One preferred arrangement makes use of rib structure waveguides.

Rib structures can be adapted to double-core waveguides so that light is efficiently guided, while a compatible field profile is maintained in the remaining part of the optical circuit.

Different versions of double-core rib waveguides are possible. In one arrangement, both the top and lower (thin core) waveguides are defined as ribs (see FIG. 26). In an alternative arrangement, only one of the two cores is provided as a rib (see FIG. 27). The latter arrangement constitutes a ridge-type waveguide, also referred to as a "single rib" waveguide. The single rib arrangement facilitates fabrication since only one, very shallow, etch is required. The double rib arrangement requires a much deeper etch to define both waveguides as ribs.

Figure 26:
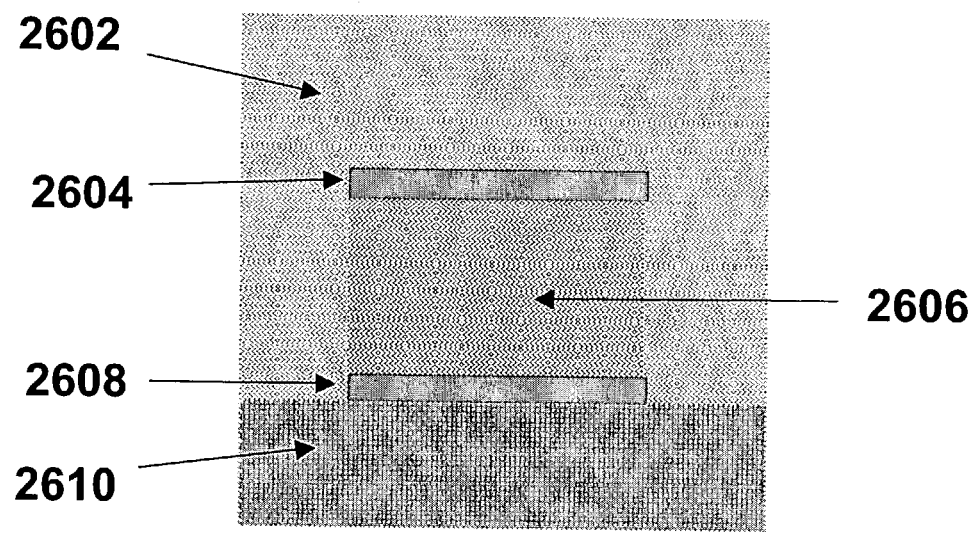
FIG. 26 shows a double core waveguide structure, both waveguide cores being defined as ribs.

The planar waveguide structure in FIG. 26 includes a buffer layer 2610, a first core layer 2608, an inter-core cladding layer 2606, a second core layer 2604 and a capping layer 2602. As may be seen, the first core layer 2608 and the second core layer 2604 are both formed as ribs. Between the core layers, the inter-core cladding layer 2606 is also in the form of a rib. The capping layer 2602, which surrounds the rib formed by the core layers and the inter-core cladding layer, has been shaded in a lighter tone to distinguish it from the inter-core cladding layer 2606. The different shading emphasises the fact that the inter-core cladding layer 2606 may be composed of a different material from either the buffer or the core layers.

Figure 27:
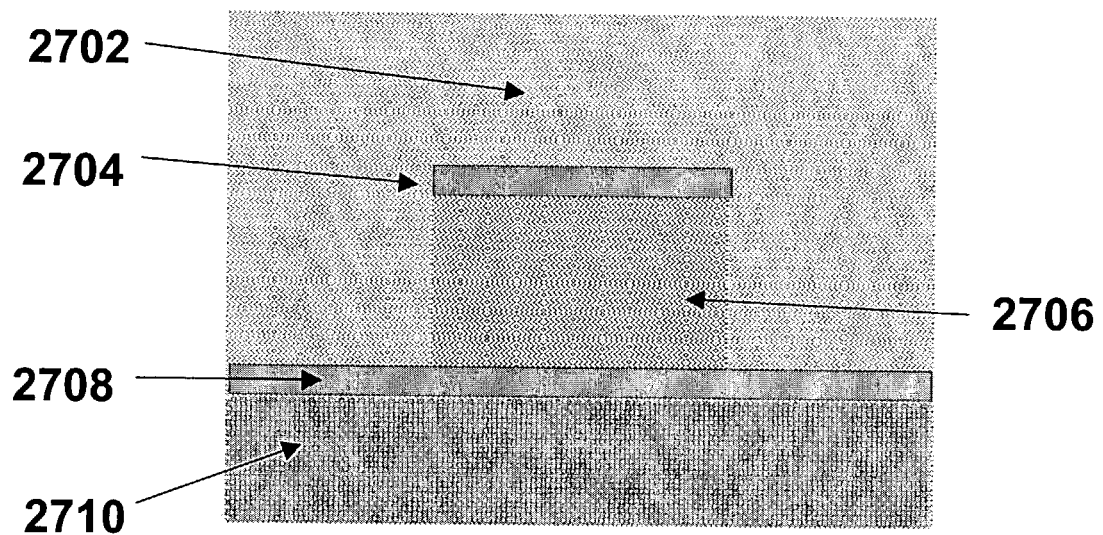
FIG. 27 shows a double core waveguide structure, the upper waveguide core being defined as a rib.

Similarly, the planar waveguide structure in FIG. 27 includes a buffer layer 2710, a first core layer 2708, an inter-core cladding layer 2706, a second core layer 2704 and a capping layer 2702. The second core layer 2704 and the inter-core cladding layer 2706 are both formed as ribs. In this case, though, the first core layer 2708 remains as a layer, and has not been provided as a rib.

Interconnection techniques are equally important for waveguide structures that include photonic crystal elements. The presence of photonic crystal elements and the particular waveguide structures incorporating PCs lend themselves to particular arrangements for allowing light to propagate from one part of the device to the other efficiently. Rib and ridge structures incorporating inter-core cladding PCs have the advantage that they allow the manufacture of even more compact optical devices. Rib structures incorporating inter-core cladding PCs provide an efficient interconnection but they also replace the need for additional bulk PCs.

FIG. 28 shows two arrangements of a double core waveguide structure with an inter-core cladding PC 2820, wherein both waveguide cores are defined as ribs. In the arrangement illustrated in FIG. 28A, the sub-regions of the inter-core cladding PC are only provided between the upper and lower cores. In the alternative arrangement illustrated in FIG. 28B, the sub-regions of the inter-core cladding PC extend to either side of the double rib waveguide structure into the surrounding cladding material.

The planar waveguide structure in FIGS. 28A and 28B include a buffer layer 2810, a first core rib 2808, an inter-core cladding rib 2806, a second core rib 2804 and a capping layer 2802. The inter-core cladding PC 2820 is formed, in FIG. 28A, by a two-dimensional array of subregions 2822 disposed in the inter-core cladding rib 2806. The PC 2820 in FIG. 28B, is identical to that in FIG. 28A except that it is provided with extra rods that extend into the surrounding capping layer 2802, and thereby provides more overlap with the expanded field profile present in the rib. In the light of the foregoing discussion, the reader will appreciate that alternative arrangements of subregions, one-dimensional as well as two-dimensional, are possible. As discussed above, clearances 2830 may be provided between the subregions and the core ribs 2804,2808.

FIG. 29 shows two arrangements of a double core waveguide structure with an inter-core cladding PC, wherein only the upper waveguide core is defined as a rib. In the arrangement illustrated in FIG. 29A, the sub-regions of the inter-core cladding PC are only provided between the upper rib and the lower core layer. In the alternative arrangement illustrated in FIG. 29B, the sub-regions of the inter-core cladding PC extend to either side of the single rib waveguide structure into the surrounding cladding material.

The planar waveguide structure in FIGS. 29A and 29B include a buffer layer 2910, a first core layer 2908, an inter-core cladding rib 2906, a second core rib 2904 and a capping layer 2902. The inter-core cladding PC 2920 is formed, in FIG. 29A, by a two-dimensional array of subregions 2922 disposed in the inter-core cladding rib 2906. The PC 2920 in FIG. 29B, is identical to that in FIG. 29A except that it is provided with extra rods that extend into the surrounding capping layer 2902, and thereby provides more overlap with the expanded field profile present in the rib. As before, alternative arrangements of subregions, one-dimensional as well as two-dimensional, are possible, and clearances 2930 may be provided between the subregions and the cores 2904,2908.

The single and double rib structures described above may further be provided with vertical waveguiding walls. In cross-section, these walled rib structures define hollow square or rectangular rib structures and naturally the cladding material on the inside of the walled structures may conveniently incorporate sub-regions, thereby forming an inter-core cladding PC.

Figure 30:
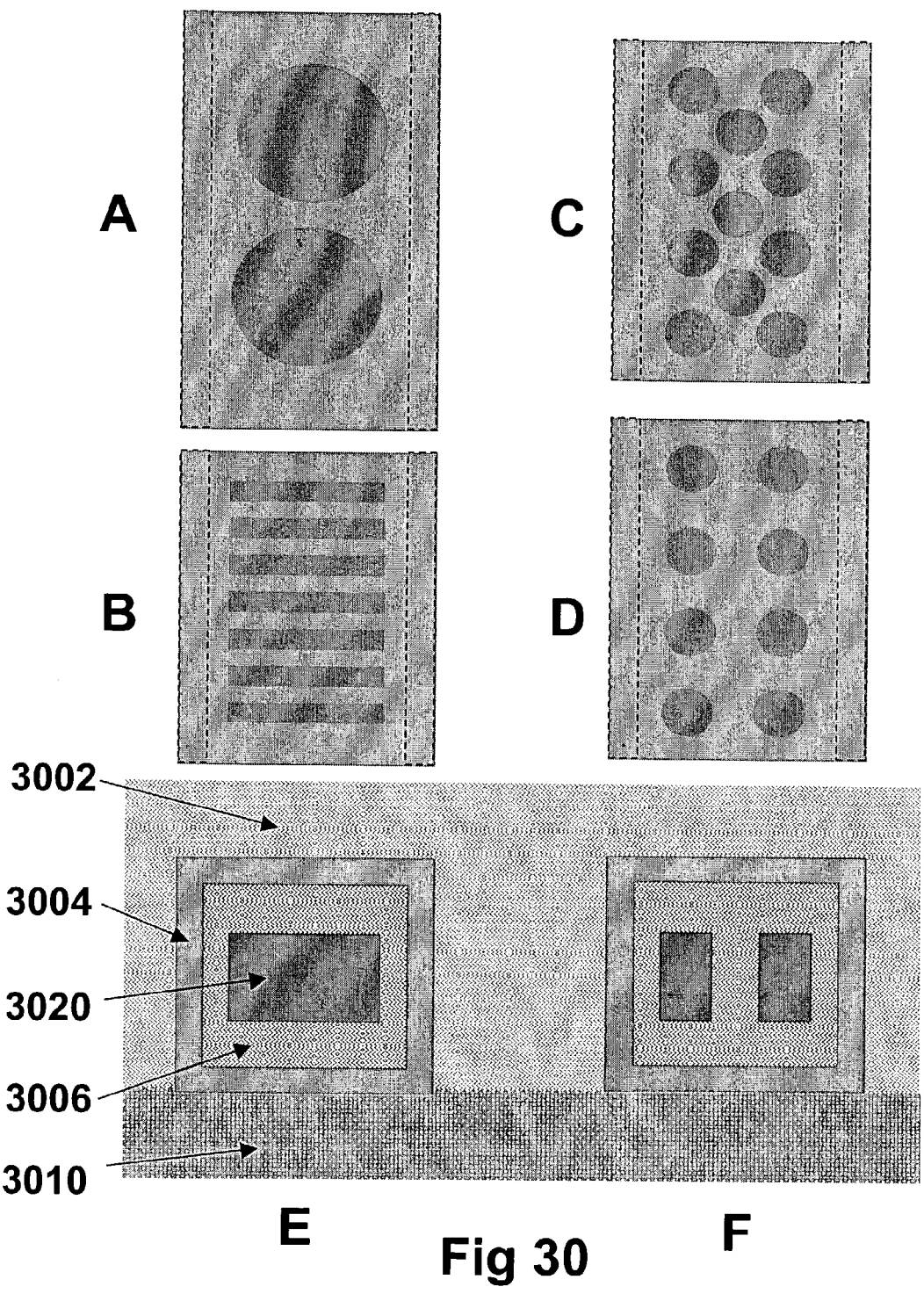
FIG. 30 shows further variants of double core waveguide structures with inter-core cladding PCs in accordance with the present invention, wherein the waveguide core is arranged as a hollow square or rectangle containing an inter-core cladding PC.

FIG. 30 shows "walled" variants of the double core waveguide structures with inter-core cladding PCs. In common with previous figures, the waveguide structures of FIG. 30 each include a buffer layer 3010, an inter-core cladding layer 3006 and a capping layer 3002. A core 3004 having a portion adjacent to the buffer layer, walls and a portion opposite the buffer layer surrounds the inter-core cladding layer 3006. The plan views in FIGS. 30A–30D represent different arrangements of subregions 3020 that form one- and two-dimensional PCs in the "walled-in" inter-core cladding layer 3006. FIG. 30A shows a two-dimensional PC arrangement referred to as a monorail. FIG. 30B shows a one-dimensional PC arrangement (having subregions in the form of slots perpendicular to the direction of light propagation). FIG. 30C shows a two-dimensional PC arrangement with rods arranged in a triangular lattice. FIG. 30D shows a two-dimensional PC arrangement with rods arranged in a square lattice. FIG. 30E represents a cross-section through either of the walled waveguide structures in FIG. 30A or 30B and FIG. 30F represents a cross-section through either of the walled waveguide structures in FIG. 30C or 30D.

One advantage of using thin waveguide cores in a high index material system is that the field mode profile is inherently large (typically greater than 3 $\mu$m in diameter). This conveniently provides a better match to an optical fibre than a conventional "thick" single core waveguide. There are, however, circumstances in which it is desirable to expand the mode out further. This can be performed by several different arrangements. In the context of rib structures the most suitable arrangement is a tapered "spot size converter".

Figure 31:
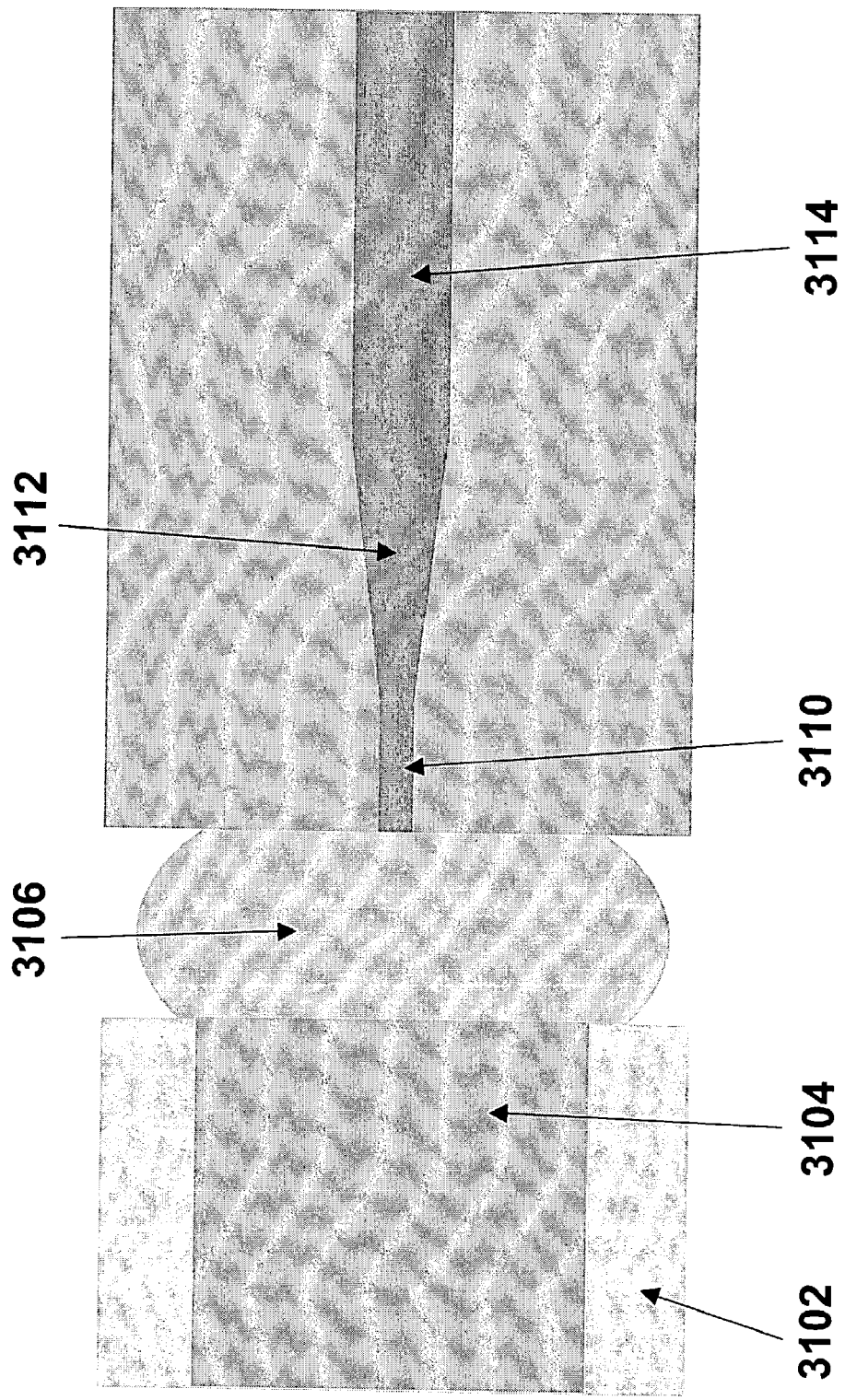
FIG. 31 shows a tapered rib arrangement suitable for use in Light on-Light off (LOLO) applications.

FIG. 31 shows the use of a tapered rib formation in a conventional single core waveguide for a generic Light on-Light off (LOLO) application. Light is conveyed along an optical fibre having a fibre core 3104 and a surrounding fibre cladding 3102 and into a waveguide segment 3114. An index matching fluid 3106 is usually applied to the end of the optical fibre in order to reduce the index contrast at the interface between the optical fibre and the waveguide. At the end of the waveguide segment 3114 adjacent to the interface with the optical fibre, there is an initial narrow segment 3110 that opens out into a tapered section 3112. The tapered section 3112 widens until the desired waveguide segment width is achieved. Using a single taper, the mode can be expanded out to the desired field profile width.

In a conventional rib design, the taper is, nevertheless, required to be very long and with very well defined edges to couple the mode efficiently from the fibre to the waveguide mode. This causes difficulty in the definition of the waveguide using e-beam lithography due to the need for very long tapers (~0.5 $\mu$m) with very narrow widths of around 50 nm on one side and 500 nm on the other. The scale of conventional tapers has an additional drawback, the e-beam lithography suffers from stitching errors (these arise when the machine needs to stitch different segments of the taper together, as the whole taper cannot be defined as one shape).

Figure 32:
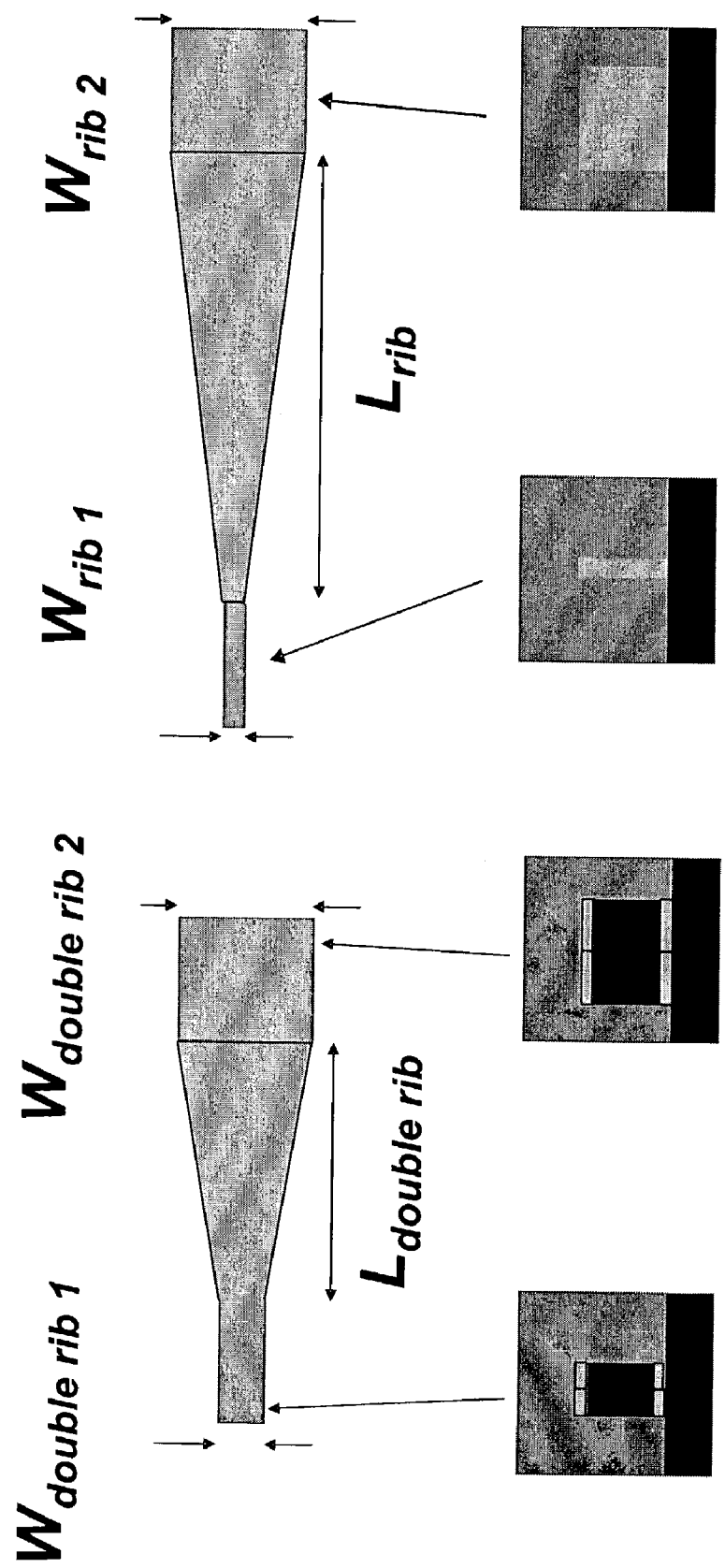
FIG. 32 shows a comparison between a tapered rib formation resulting from the use of a two-rib double core waveguide structure with an inter-core cladding PC in accordance with a further aspect of the present invention and a tapered rib formation in a ribbed conventional single core waveguide structure.

However, when double core waveguides are used, the tapering does not need to be as long or as extreme, and the fabrication tolerances can hence be relaxed dramatically. FIG. 32 shows a comparison between two tapered rib formations resulting from the provision of a tapered section in (A) a double core waveguide structure with both cores provided as ribs (as illustrated in FIG. 26) and (B) a conventional single core, rib waveguide structure. Although not illustrated, the "single ribbed" structure in FIGS. 27, 29A and 29B can also be provided with a tapered section. Again, the double core structure allows the tapered section to be shorter than an equivalent conventional single core structure.

The taper arrangement permits the straightforward manufacture of a convenient interface between an optical fibre and a double core waveguide structure (with or without inter-core cladding PC). Although not required, the tapered portions of the double core waveguide structures (as in FIG. 32A) may be provided with an inter-core cladding PC. Examples of tapered, double core structures with inter-core cladding PCs are shown in FIG. 33.

FIGS. 33A to 33D show plan views of ribbed planar waveguide structures with tapers (double tapers in the case of FIGS. 33C and 33D). FIGS. 33E to 33H show cross-sectional views of the structures in FIGS. 33A to 33D, respectively.

Figure 33:
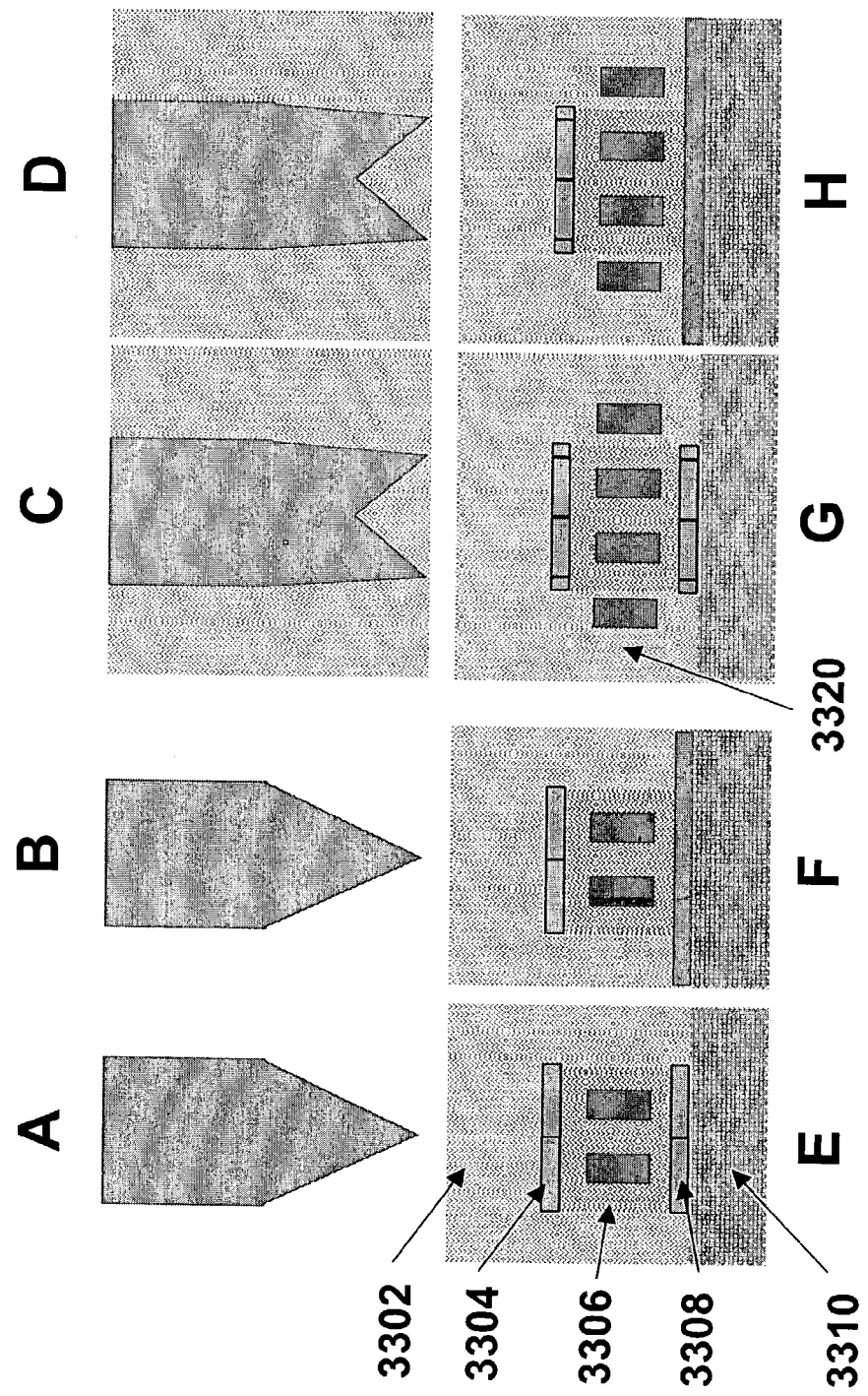
FIG. 33 shows plan and cross-sectional views of ribbed planar waveguide structures with single or double tapers.

In the cross-sectional views in FIG. 33, the planar waveguide structure is seen to include a buffer layer 3310, a first core rib/layer 3308, an inter-core cladding rib 3306, a second core rib 3304 and a capping layer 3302. An inter-core cladding PC 3320 is formed by an array of subregions 3322 disposed in the inter-core cladding rib 3306. The PC 3320 in FIGS. 33G and 33H is provided with rods that extend into the surrounding capping layer 3302, and thereby provides more overlap with the expanded field profile present in the double tapered rib.

The double taper feature shown in FIGS. 33C and 33D allows a finer degree of tuning. Typically, the mode profile from a waveguide core is not perfectly circular, and using such a rib arrangement the mode can be fine tuned to match the circular mode of the fibre more accurately. Alternatively, an asymmetric mode may be required, for instance, to launch into some cylindrical lens system, then the width and height need to be adjusted accordingly.

All the previous designs propose the use of the thin double core structure in planar devices. The present invention is not however limited to such structures, the double core feature of the present invention can equally be applied to the structure of optical fibres.

FIG. 34 shows cross-sectional views of three optical fibre waveguide structures in accordance with the present invention. In cross-section, an optical fibre is substantially circular and any straight line cutting through the centre of the fibre will cross the edge of the fibre at two diametrically opposite points. The simplest "double core" optical fibre embodiment is shown in FIG. 34A. Here, an (inter-core) cladding 3402 is composed of a low index material (e.g. Silicon Dioxide n=1.46), while an annular core 3404 is composed of a thin layer of a high index material (e.g. Silicon or Silicon Nitride). A capping layer 3406 made of a suitable capping material, having a low index (e.g. Silicon Dioxide n=1.46) surrounds the core 3404. A line cutting through the centre of the fibre in this case will effectively experience two waveguiding cores, since it will always cross the core 3404 at two diametrically opposite points.

Alternative embodiments, (shown in FIGS. 34B and 34C) rely on reducing the average refractive index of the cladding, by introducing air cavities 3408 in the cladding. By controlling the introduction of air cavities the cladding refractive index can be fine tuned to a desired value. Advantageously, the cladding refractive index may be configured so that the average index is substantially 1. FIGS. 34B and 34C show air pockets 3408 in symmetrical patterns. An internal pattern is preferred in order to provide structural support for the thin core. The cross-sectional pattern formed by air pockets may adopt numerous different geometries provided that pattern lends sufficient structural support.

Double core optical fibre structures with inter-core cladding PCs provide multi-moded waveguides that confine the different modes in a similar way and hence possess very similar effective mode indexes. This also implies that these waveguides can handle high power applications while still maintaining relatively low dispersion relations. The devices will be able to handle high power because most of the field will be confined in the air inner cladding.

For the first optical fibre embodiment, these fibre structure can be fabricated using a pre-formation stage. Firstly, a glass tube is coated with a high index material. The high index material is preferably deposited using Metal Organic CVP (MOCVP). A glass rod is then placed inside the coated glass tube. The two parts are heated so that the tube collapses onto the glass rod. The fused structure is then pulled in the conventional manner to form the fibre. Alternatively, instead of a glass rod in the centre many smaller glass tubes can be used (as shown in the second embodiment).

Figure 35:
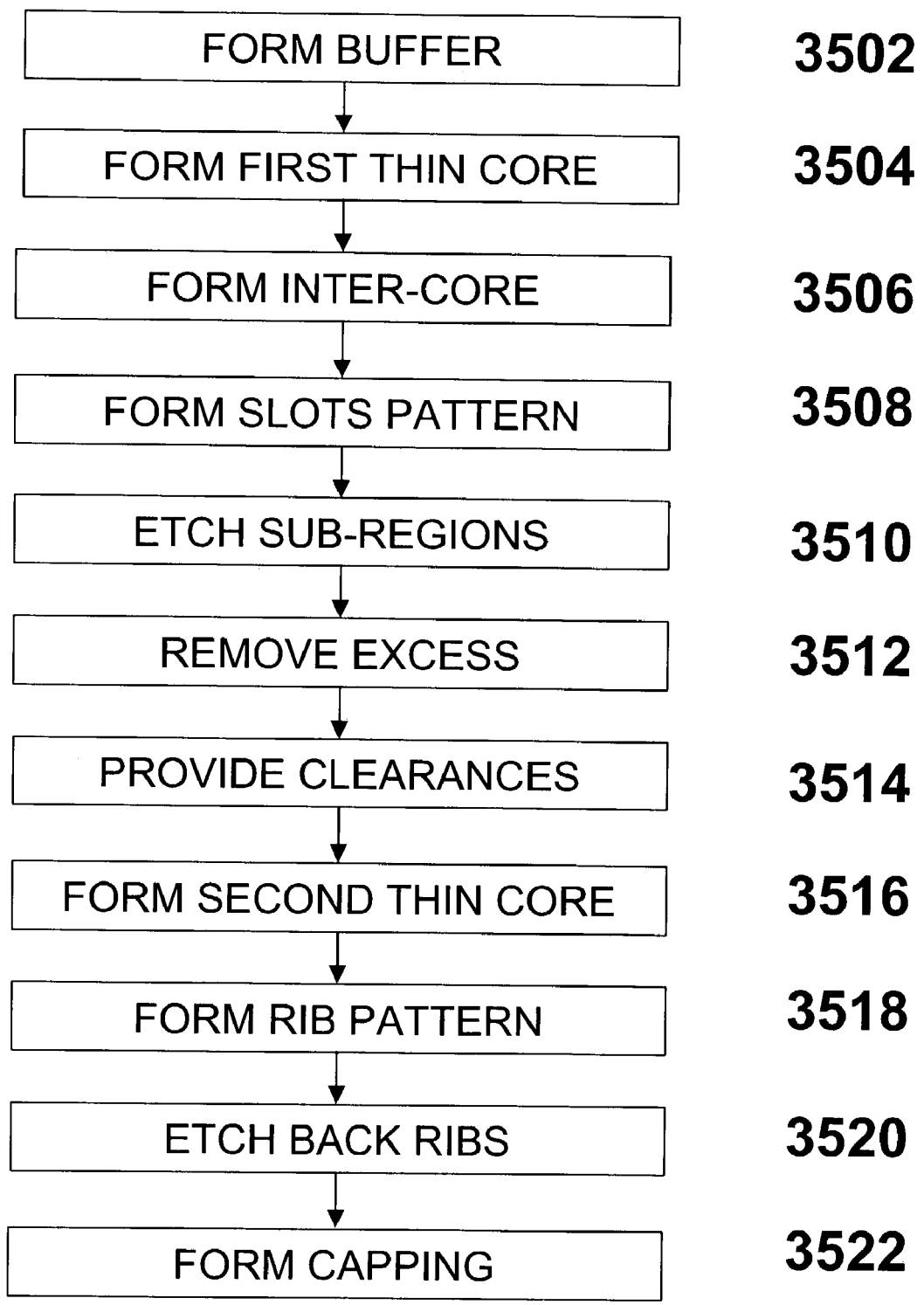

FIG. 35 shows a flow diagram of the manufacture of double core waveguide structures in accordance with the present invention. Firstly, a buffer layer of Silicon Dioxide is put down by thermal oxidation, HIPOX or PECVD depending on whether a thin or thick oxide is being deposited (Step 3502).

The thin core layer is put down next, this may be Silicon Nitride, Silicon Oxynitride, Tantalum Pentoxide, or doped-Silicon Dioxide (Step 3504).

The inter-core cladding is then deposited; this may be composed of Silicon Nitride, Silicon Oxynitride, Tantalum Pentoxide, or doped-Silicon Dioxide depending on the desired refractive index (Step 3506).

The photonic crystal holes or slots pattern is defined either by using direct-write e-beam lithography, or transferred from a mask (Step 3508).

The photonic crystal holes pattern is etched through the cladding layer by either dry etching or wet etching (dry etching is preferable) (Step 3510). The etch depth will determine the final clearance between the lower thin core and the cladding PC rods.

The holes are then filled by a third material. This material may be Silicon (single crystal, amorphous, or polysilicon), Silicon Dioxide, Silicon Oxynitride, a non-linear dielectric, nanoparticles, an active material (such as a Rare-Earth doped glass) or a polymer, plastic or resist. To fill the holes with Silicon (including the other crystalline forms) you could use PECVD, CVD, MBE or sputtering. For dielectrics, PECVD, CVD or sputtering is used.

Having filled the holes, it is likely that some of the hole filling material will also have deposited on the top of the core layer. This material is removed by either dry-etching, controlled wet-etching or CMP (chemical mechanical polish) (Step 3512). Dry-etching is preferred.

A thin layer of the cladding material may be required to provide the clearance on top of the cladding PC as well (Step 3514). Alternatively, if air slots or rods are required, the deposition of the cladding material can be performed without filling the holes. Using the right deposition conditions the cladding material will only overcoat the holes.

After the growth of the inter-core cladding, a second, top, thin core layer is grown (Step 3516). The waveguides can then be defined by another stage of direct-write e-beam lithography, or transferred from a mask, (Step 3518) and then etched (Step 3520). A deep etch will define ribs in the top and lower thin cores, while a shollower etch will only provide a rib in the top thin core.

Finally, a top capping layer of Silicon Dioxide is deposited by PECVD, CVD or sputtering (Step 3522).

We claim:

1. A planar waveguide structure having a first core layer, a second core layer and an inter-core cladding layer disposed between a surface of the first core layer and a surface of the second core layer, wherein the inter-core cladding layer comprises a first region having a first refractive index, $n_{inter}$, and a plurality of sub-regions formed therein having a second refractive index, $n_{sub}$, said plurality of sub-regions comprising an array in a plane that is parallel to the surfaces of the two core layers wherein each sub-region is enclosed by said first region in said plane and extends perpendicular to said plane but does not extend into the first or the second core layer, the array of sub-regions giving rise to a photonic band structure region, which is effective to perturb an evanescent field of an optical signal propagating through the first and second core layers.

2. A waveguide structure as claimed in claim 1, wherein an effective mode index contrast acting upon the optical signal as the signal passes through the photonic band structure region is greater than 0.1 percent.

3. A waveguide structure as claimed in claim 1, wherein the first core layer has a first thickness and the second core layer has a second thickness, the first thickness being different from the second thickness, such that a field profile of an optical signal propagating through the core layers is asymmetric with respect to the core layers.

4. A waveguide structure as claimed in claim 1, wherein a clearance is provided in the inter-core cladding layer between the array of sub-regions and at least one of the core layers, such that the material of the sub-regions is spaced apart from the core layer at a pre-determined distance.

5. A waveguide structure as claimed in claim 1, wherein the first region is formed of a $SiO_2$ glass.

6. A waveguide structure as claimed in claim 1, wherein the sub-regions are air filled holes.

7. A waveguide structure as claimed in claim 1, wherein the sub-regions are formed from silicon.

8. A waveguide structure as claimed in claim 1, wherein the sub-regions are arranged in a one dimensional array.

9. A waveguide structure as claimed in claim 1, wherein the sub-regions are arranged in a two dimensional array.

10. A waveguide structure as claimed in claim 1, the structure further comprising a first outer cladding layer, the first outer cladding layer comprising a first outer cladding region having a third refractive index $n_{outer\_1}$.

11. A waveguide structure as claimed in claim 10, wherein the first outer cladding layer further comprises an array of first outer cladding sub-regions having a fourth refractive index $n_{out\_sub\_1}$, which do not extend into the core layer, the array of first outer cladding sub-regions giving rise to a first outer cladding photonic band structure region, which is effective to perturb further the evanescent field of the optical signal propagating through the core layers.

12. A waveguide structure as claimed in claim 11, wherein effective mode index contrast acting upon the optical signal as the signal passes through the first outer cladding photonic band structure region is greater than 0.1 percent.

13. A waveguide structure as claimed in claim 11, wherein the first outer cladding region is formed of a $SiO_2$ glass.

14. A waveguide structure as claimed in claim 11, wherein the first outer cladding sub-regions are air filled holes.

15. A waveguide structure as claimed in claim 11, wherein the first outer cladding sub-regions are formed from silicon.

16. A waveguide structure as claimed in claim 11, wherein the first outer cladding sub-regions are arranged in a one dimensional array.

17. A waveguide structure as claimed in claim 11, wherein the first outer cladding sub-regions are arranged in a two dimensional array.

18. A waveguide structure as claimed in claim 10, wherein said first outer cladding layer is a buffer layer disposed adjacent to the first core layer at an opposite side of the first core layer from the inter-core cladding layer.

19. A waveguide structure as claimed in claim 10, wherein said first outer cladding layer is a capping layer disposed adjacent to the second core layer at an opposite side of the second core layer from the inter-core cladding layer.

20. A waveguide structure as claimed in claim 10, the structure further comprising a second outer cladding layer, the second outer cladding layer comprising a second outer cladding region having a fifth refractive index $n_{outer\_2}$.

21. A waveguide structure as claimed in claim 20, the second outer cladding layer further comprising an array of second outer cladding sub-regions having a sixth refractive index $n_{out\_sub\_2}$, which do not extend into the core layer, the array of second outer cladding sub-regions giving rise to a second outer cladding photonic band structure region, which is effective to perturb further the evanescent field of the optical signal propagating through the core layers.

22. A waveguide structure as claimed in claim 21, wherein an effective mode index contrast acting upon the optical signal as the signal passes through the second outer cladding photonic band structure region is greater than 0.1 percent.

23. A waveguide structure as claimed in claim 21, wherein the second outer cladding region is formed of a $SiO_2$ glass.

24. A waveguide structure as claimed in claim 21, wherein the second outer cladding sub-regions are air filled holes.

25. A waveguide structure as claimed in claim 21, wherein the second outer cladding sub-regions are formed from silicon.

26. A waveguide structure as claimed in claim 21, wherein the second outer cladding sub-regions are arranged in a one dimensional array.

27. A waveguide structure as claimed in claim 21, wherein the second outer cladding sub-regions are arranged in a two dimensional array.

28. A waveguide structure as claimed in claim 20, wherein the inter-core cladding layer is formed of a first material, the first outer cladding layer is formed of a second material and the second outer cladding layer is formed of a third material, and wherein the first material has a higher refractive index than either the second material or the third material.

29. A waveguide structure as claimed in claim 28, wherein the first and second core layers are formed of a fourth and fifth material respectively and wherein the first material is different from the second, third, fourth and fifth materials.

30. A waveguide structure as claimed in claim 10, wherein a clearance is provided in the first outer cladding layer between the array of first outer cladding sub-regions and at least one of the core layers, such that the material of the first outer cladding sub-regions is spaced apart from the core layer at a pre-determined distance.

31. A waveguide structure as claimed in claim 30, wherein a clearance is provided in the second outer cladding layer between the second outer cladding sub-regions and at least one of the core layers, such that the material of the second outer cladding sub-regions is spaced apart from the core layer at a pre-determined distance.

32. A waveguide structure as claimed in claim 1, wherein the first core layer and the second core layer are formed from a diffused material.

33. A waveguide structure as claimed in claim 1, wherein the first core layer and the second core layer are formed from a graded material.

34. A waveguide structure as claimed in claim 1, wherein at least one of the first core layer and the second core layer is formed as a rib having a predetermined breadth.

35. A waveguide structure as claimed in claim 34, wherein the or each ribbed core is tapered from a first predetermined breadth to a second predetermined breadth, the second predetermined breadth being less than the first predetermined breadth.

36. A waveguide structure as claimed in claim 1, wherein both the first core layer and the second core layer are formed as ribs.

37. A waveguide structure as claimed in claim 1, wherein the array of sub-regions in the inter-core cladding layer extends beyond the breadth of the rib.

38. A waveguide structure as claimed in claim 1, the first core layer being provided with a pair of vertical sidewalls, each of the sidewalls extending from an edge of the first rib to a corresponding edge of the second rib, thereby forming a core with rectangular cross-section.

* * * * *